United States Patent
Lian et al.

(10) Patent No.: US 11,885,938 B2
(45) Date of Patent: Jan. 30, 2024

(54) OPTICAL IMAGING LENS

(71) Applicant: GENIUS ELECTRONIC OPTICAL (XIAMEN) CO., LTD., Fujian (CN)

(72) Inventors: Jiali Lian, Fujian (CN); Huabin Liao, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 49 days.

(21) Appl. No.: 17/378,791

(22) Filed: Jul. 19, 2021

(65) Prior Publication Data

US 2022/0003972 A1 Jan. 6, 2022

Related U.S. Application Data

(63) Continuation of application No. 17/224,125, filed on Apr. 7, 2021, now Pat. No. 11,586,021, which is a continuation of application No. 16/429,067, filed on Jun. 3, 2019, now Pat. No. 11,002,946, which is a continuation of application No. 15/915,068, filed on Mar. 8, 2018, now Pat. No. 10,466,445.

(30) Foreign Application Priority Data

Dec. 29, 2017 (CN) .......................... 201711477924.0

(51) Int. Cl.
G02B 13/00 (2006.01)
G02B 9/64 (2006.01)
G02B 3/04 (2006.01)

(52) U.S. Cl.
CPC ........... *G02B 13/0045* (2013.01); *G02B 3/04* (2013.01); *G02B 9/64* (2013.01)

(58) Field of Classification Search
CPC ......... G02B 13/0045; G02B 3/04; G02B 9/64
USPC ........................................ 359/708, 751, 755
See application file for complete search history.

(56) References Cited

U.S. PATENT DOCUMENTS

| | | | |
|---|---|---|---|
| 2014/0211324 A1* | 7/2014 | Ishizaka | G02B 27/0025 359/708 |
| 2016/0085058 A1 | 3/2016 | Chae | |
| 2017/0227734 A1* | 8/2017 | Huang | G02B 9/64 |

FOREIGN PATENT DOCUMENTS

| | | |
|---|---|---|
| CN | 107490840 | 12/2017 |
| TW | 201732361 | 9/2017 |

OTHER PUBLICATIONS

"Office Action of Taiwan Counterpart Application", dated Aug. 25, 2021, p. 1-p. 5.

* cited by examiner

*Primary Examiner* — William Choi
(74) *Attorney, Agent, or Firm* — JCIPRNET

(57) ABSTRACT

An optical imaging lens including a first to a seventh lens elements arranged in sequence from an object side to an image side along an optical axis is provided. Each lens element includes an object-side surface and an image-side surface. A periphery region of the object-side surface of the second lens element is convex. An optical axis region of the image-side surface of the third lens element is concave. The fifth lens element has negative refracting power and a periphery region of the object-side surface of the fifth lens element is concave. Furthermore, the optical imaging lens satisfies the condition expression: ALT/T1≤4.500.

19 Claims, 30 Drawing Sheets

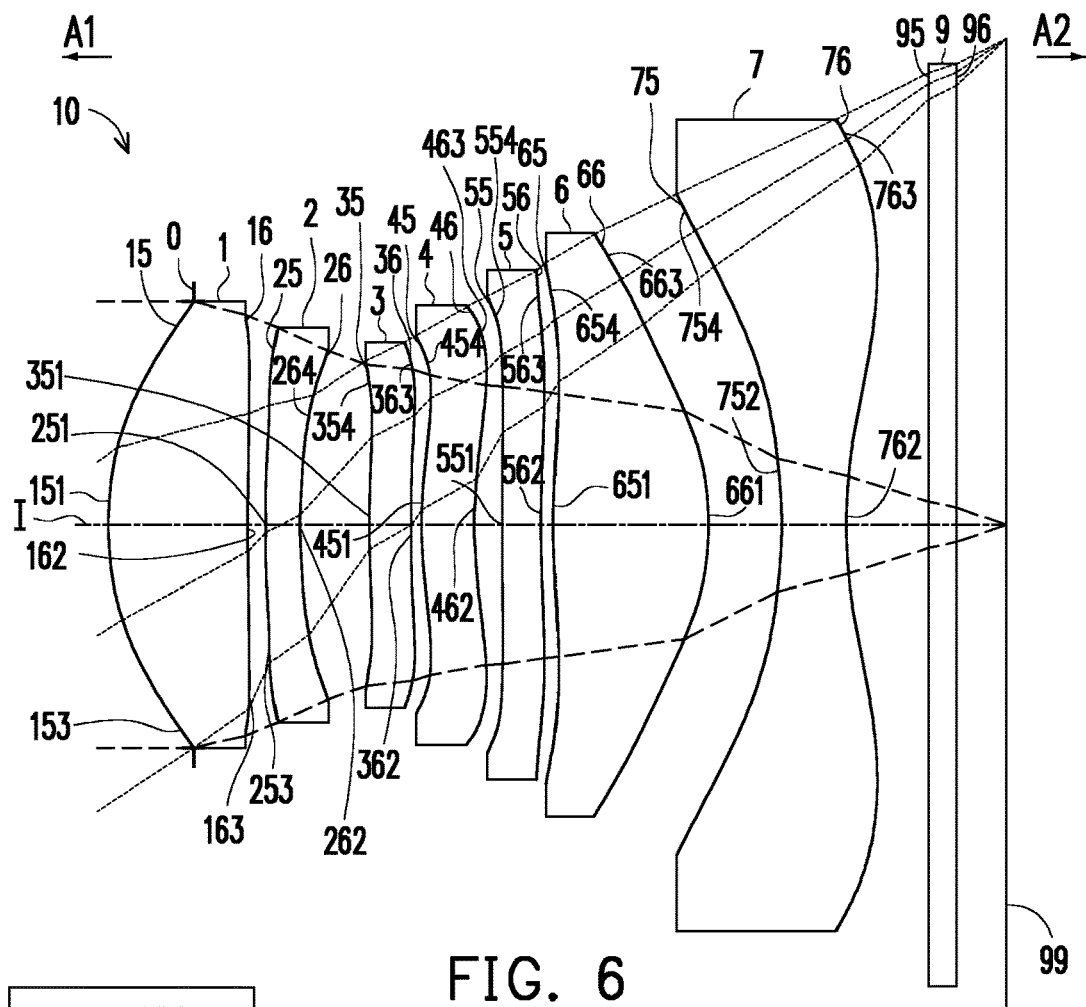
FIG. 6
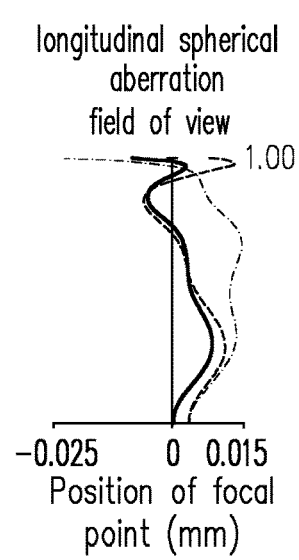
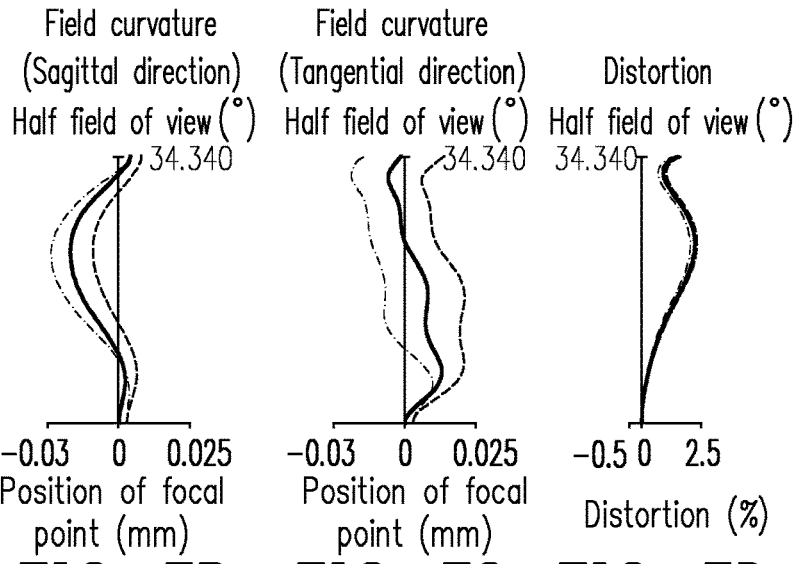
FIG. 7A  FIG. 7B  FIG. 7C  FIG. 7D

| First embodiment ||||||||
|---|---|---|---|---|---|---|---|
| | System length (TTL)=6.463 mm, Effective focal length(EFL)= 5.045 mm, Half field of view(HFOV)=34.340°, Image height= 3.500 mm, F-number=1.580 ||||||||
| Element | Surface | Surface type | Radius (mm) | Thickness (mm) | Material | Refractive index (Nd) | Abbe Number | Focal length(mm) |
| Object | | | Infinity | Infinity | | | | |
| Aperture 0 | | | Infinity | -0.607 | | | | |
| First lens element 1 | Object-side surface 15 | Aspheric surface | 2.196 | 1.004 | Plastic | 1.545 | 55.987 | 4.673 |
| | Image-side surface 16 | Aspheric surface | 13.190 | 0.128 | | | | |
| Second lens element 2 | Object-side surface 25 | Aspheric surface | 8.661 | 0.244 | Plastic | 1.661 | 20.373 | -10.997 |
| | Image-side surface 26 | Aspheric surface | 3.927 | 0.500 | | | | |
| Third lens element 3 | Object-side surface 35 | Aspheric surface | 15.677 | 0.298 | Plastic | 1.661 | 20.373 | -16.382 |
| | Image-side surface 36 | Aspheric surface | 6.391 | 0.075 | | | | |
| Fourth lens element 4 | Object-side surface 45 | Aspheric surface | 3.045 | 0.387 | Plastic | 1.661 | 20.373 | 18.748 |
| | Image-side surface 46 | Aspheric surface | 3.820 | 0.201 | | | | |
| Fifth lens element 5 | Object-side surface 55 | Aspheric surface | 31.795 | 0.273 | Plastic | 1.661 | 20.373 | -7.393 |
| | Image-side surface 56 | Aspheric surface | 4.255 | 0.088 | | | | |
| Sixth lens element 6 | Object-side surface 65 | Aspheric surface | 4.084 | 1.122 | Plastic | 1.545 | 55.987 | 2.334 |
| | Image-side surface 66 | Aspheric surface | -1.674 | 0.525 | | | | |
| Seventh lens element 7 | Object-side surface 75 | Aspheric surface | -3.034 | 0.455 | Plastic | 1.545 | 55.987 | -2.807 |
| | Image-side surface 76 | Aspheric surface | 3.264 | 0.589 | | | | |
| Filter 9 | Object-side surface 95 | Aspheric surface | Infinity | 0.210 | | 1.517 | 64.167 | |
| | Image-side surface 96 | Aspheric surface | Infinity | 0.363 | | | | |
| Image plane 99 | | | Infinity | | | | | |

FIG. 8

| Surface | K | $a_2$ | $a_4$ | $a_6$ | $a_8$ |
|---|---|---|---|---|---|
| 15 | 4.026450E-01 | 0.000000E+00 | -5.677928E-03 | -1.641789E-03 | -6.183097E-04 |
| 16 | -1.382361E+02 | 0.000000E+00 | -2.153304E-02 | -1.453180E-03 | 1.246765E-02 |
| 25 | -2.422036E+01 | 0.000000E+00 | -4.430825E-02 | 1.397004E-02 | 2.149895E-02 |
| 26 | 4.098751E+00 | 0.000000E+00 | -3.145600E-02 | 2.536347E-03 | 2.716690E-02 |
| 35 | -9.900000E+01 | 0.000000E+00 | 1.000406E-02 | -4.680511E-02 | 3.635923E-02 |
| 36 | -9.900000E+01 | 0.000000E+00 | -1.317558E-02 | -2.896760E-02 | 3.694429E-02 |
| 45 | -2.284348E+01 | 0.000000E+00 | -2.567539E-02 | -6.403513E-02 | 6.615571E-02 |
| 46 | -1.118429E+01 | 0.000000E+00 | 1.693487E-03 | -8.280758E-02 | 8.861691E-02 |
| 55 | -9.900000E+01 | 0.000000E+00 | -2.268348E-02 | 2.237713E-02 | -2.703657E-02 |
| 56 | -9.900000E+01 | 0.000000E+00 | -8.427546E-02 | 8.740752E-02 | -6.518116E-02 |
| 65 | -9.900000E+01 | 0.000000E+00 | -6.803867E-02 | 6.176949E-02 | -3.851688E-02 |
| 66 | -6.413041E-01 | 0.000000E+00 | 6.426669E-02 | -1.487838E-02 | 3.189871E-03 |
| 75 | -1.280757E+01 | 0.000000E+00 | 6.157569E-03 | -1.819492E-02 | 6.054332E-03 |
| 76 | 0.000000E+00 | 0.000000E+00 | -3.843914E-02 | 2.812415E-03 | -2.283369E-05 |
| Surface | $a_{10}$ | $a_{12}$ | $a_{14}$ | $a_{16}$ | |
| 15 | -5.342118E-04 | 3.129692E-04 | -1.300340E-04 | 0.000000E+00 | |
| 16 | -9.733525E-03 | 3.051785E-03 | -3.702494E-04 | 0.000000E+00 | |
| 25 | -1.968126E-02 | 7.110477E-03 | -8.924298E-04 | 0.000000E+00 | |
| 26 | -2.804913E-02 | 1.287820E-02 | -2.341496E-03 | 0.000000E+00 | |
| 35 | -3.738594E-02 | 2.312504E-02 | -8.340209E-03 | 1.403458E-03 | |
| 36 | -4.348456E-02 | 2.386009E-02 | -7.014153E-03 | 1.066422E-03 | |
| 45 | -3.180182E-02 | 1.810955E-04 | 3.820582E-03 | -7.621038E-04 | |
| 46 | -5.732676E-02 | 2.177564E-02 | -4.719897E-03 | 4.464950E-04 | |
| 55 | 1.816571E-02 | -7.065380E-03 | 1.444002E-03 | -1.310442E-04 | |
| 56 | 2.987783E-02 | -7.681560E-03 | 1.000279E-03 | -5.013935E-05 | |
| 65 | 1.499775E-02 | -3.535636E-03 | 4.504213E-04 | -2.287691E-05 | |
| 66 | 8.423534E-05 | -1.430478E-04 | 1.949346E-05 | -1.073287E-06 | |
| 75 | -8.960347E-04 | 7.173643E-05 | -3.447738E-06 | 9.789343E-08 | |
| 76 | -4.014107E-05 | 3.311068E-06 | -6.531548E-09 | -4.997266E-09 | |

FIG. 9

| Second embodiment ||||||||
|---|---|---|---|---|---|---|---|
| System length(TTL)= 6.657 mm, Effective focal length(EFL)= 4.918 mm, Half field of view(HFOV)=33.570°, Image height= 3.500 mm, F-number=1.582 ||||||||
| Element | Surface | Surface type | Radius (mm) | Thickness (mm) | Material | Refractive index (Nd) | Abbe Number | Focal length(mm) |
| Object | | | Infinity | Infinity | | | | |
| Aperture 0 | | | Infinity | -0.584 | | | | |
| First lens element 1 | Object-side surface 15 | Aspheric surface | 2.279 | 0.963 | Plastic | 1.545 | 55.987 | 5.285 |
| | Image-side surface 16 | Aspheric surface | 9.201 | 0.105 | | | | |
| Second lens element 2 | Object-side surface 25 | Aspheric surface | 9.420 | 0.370 | Plastic | 1.661 | 20.373 | -15.513 |
| | Image-side surface 26 | Aspheric surface | 4.854 | 0.405 | | | | |
| Third lens element 3 | Object-side surface 35 | Aspheric surface | 8.812 | 0.387 | Plastic | 1.661 | 20.373 | -32.949 |
| | Image-side surface 36 | Aspheric surface | 6.180 | 0.102 | | | | |
| Fourth lens element 4 | Object-side surface 45 | Aspheric surface | 2.883 | 0.342 | Plastic | 1.661 | 20.373 | 24.454 |
| | Image-side surface 46 | Aspheric surface | 3.335 | 0.204 | | | | |
| Fifth lens element 5 | Object-side surface 55 | Aspheric surface | 116.314 | 0.315 | Plastic | 1.661 | 20.373 | -7.941 |
| | Image-side surface 56 | Aspheric surface | 5.062 | 0.070 | | | | |
| Sixth lens element 6 | Object-side surface 65 | Aspheric surface | 4.763 | 1.452 | Plastic | 1.545 | 55.987 | 2.476 |
| | Image-side surface 66 | Aspheric surface | -1.686 | 0.601 | | | | |
| Seventh lens element 7 | Object-side surface 75 | Aspheric surface | -2.580 | 0.500 | Plastic | 1.545 | 55.987 | -2.610 |
| | Image-side surface 76 | Aspheric surface | 3.405 | 0.589 | | | | |
| Filter 9 | Object-side surface 95 | Aspheric surface | Infinity | 0.210 | | 1.517 | 64.167 | |
| | Image-side surface 96 | Aspheric surface | Infinity | 0.040 | | | | |
| Image plane 99 | | | Infinity | | | | | |

FIG. 12

| Surface | K | $a_2$ | $a_4$ | $a_6$ | $a_8$ |
|---|---|---|---|---|---|
| 15 | 4.584679E-01 | 0.000000E+00 | -4.941575E-03 | 4.941426E-04 | -2.275236E-03 |
| 16 | -1.147857E+02 | 0.000000E+00 | -1.772194E-02 | -1.016003E-02 | 1.961205E-02 |
| 25 | -4.955821E+01 | 0.000000E+00 | -3.522247E-02 | -1.597889E-03 | 2.782621E-02 |
| 26 | 5.458173E+00 | 0.000000E+00 | -1.393699E-02 | -8.388556E-03 | 2.610885E-02 |
| 35 | -9.900000E+01 | 0.000000E+00 | 2.043426E-02 | -4.501873E-02 | 3.537280E-02 |
| 36 | -9.900000E+01 | 0.000000E+00 | -1.173056E-02 | -2.796279E-02 | 3.625474E-02 |
| 45 | -1.902065E+01 | 0.000000E+00 | -1.848829E-02 | -6.577690E-02 | 6.617995E-02 |
| 46 | -1.187949E+01 | 0.000000E+00 | 7.928211E-03 | -8.309729E-02 | 8.813501E-02 |
| 55 | -9.900000E+01 | 0.000000E+00 | -3.382916E-02 | 1.958554E-02 | -2.649189E-02 |
| 56 | -9.900000E+01 | 0.000000E+00 | -8.065432E-02 | 8.797158E-02 | -6.512611E-02 |
| 65 | -9.900000E+01 | 0.000000E+00 | -5.482788E-02 | 6.091636E-02 | -3.842196E-02 |
| 66 | -5.279289E-01 | 0.000000E+00 | 5.776035E-02 | -1.524744E-02 | 3.035859E-03 |
| 75 | -8.676138E+00 | 0.000000E+00 | -2.990154E-04 | -1.901979E-02 | 5.911784E-03 |
| 76 | 0.000000E+00 | 0.000000E+00 | -3.187285E-02 | 2.158828E-03 | 4.365614E-05 |
| Surface | $a_{10}$ | $a_{12}$ | $a_{14}$ | $a_{16}$ | |
| 15 | 7.457474E-04 | -6.608676E-05 | -7.096908E-05 | 0.000000E+00 | |
| 16 | -1.118047E-02 | 2.653725E-03 | -2.108545E-04 | 0.000000E+00 | |
| 25 | -1.880639E-02 | 5.362921E-03 | -4.815479E-04 | 0.000000E+00 | |
| 26 | -2.206140E-02 | 9.040222E-03 | -1.576698E-03 | 0.000000E+00 | |
| 35 | -3.810044E-02 | 2.280945E-02 | -8.340210E-03 | 1.403458E-03 | |
| 36 | -4.382211E-02 | 2.432203E-02 | -7.013923E-03 | 1.066422E-03 | |
| 45 | -3.143742E-02 | 4.057234E-04 | 3.979988E-03 | -7.621038E-04 | |
| 46 | -5.738560E-02 | 2.179253E-02 | -4.699918E-03 | 4.546450E-04 | |
| 55 | 1.846342E-02 | -7.000521E-03 | 1.445489E-03 | -1.394435E-04 | |
| 56 | 2.991102E-02 | -7.672365E-03 | 1.000381E-03 | -5.166185E-05 | |
| 65 | 1.494502E-02 | -3.557222E-03 | 4.481099E-04 | -2.167785E-05 | |
| 66 | 8.933375E-05 | -1.419533E-04 | 1.950476E-05 | -1.189145E-06 | |
| 75 | -9.148389E-04 | 6.847228E-05 | -3.782054E-06 | 1.313630E-07 | |
| 76 | -4.015806E-05 | 2.998455E-06 | -2.630025E-08 | -3.861853E-09 | |

FIG. 13

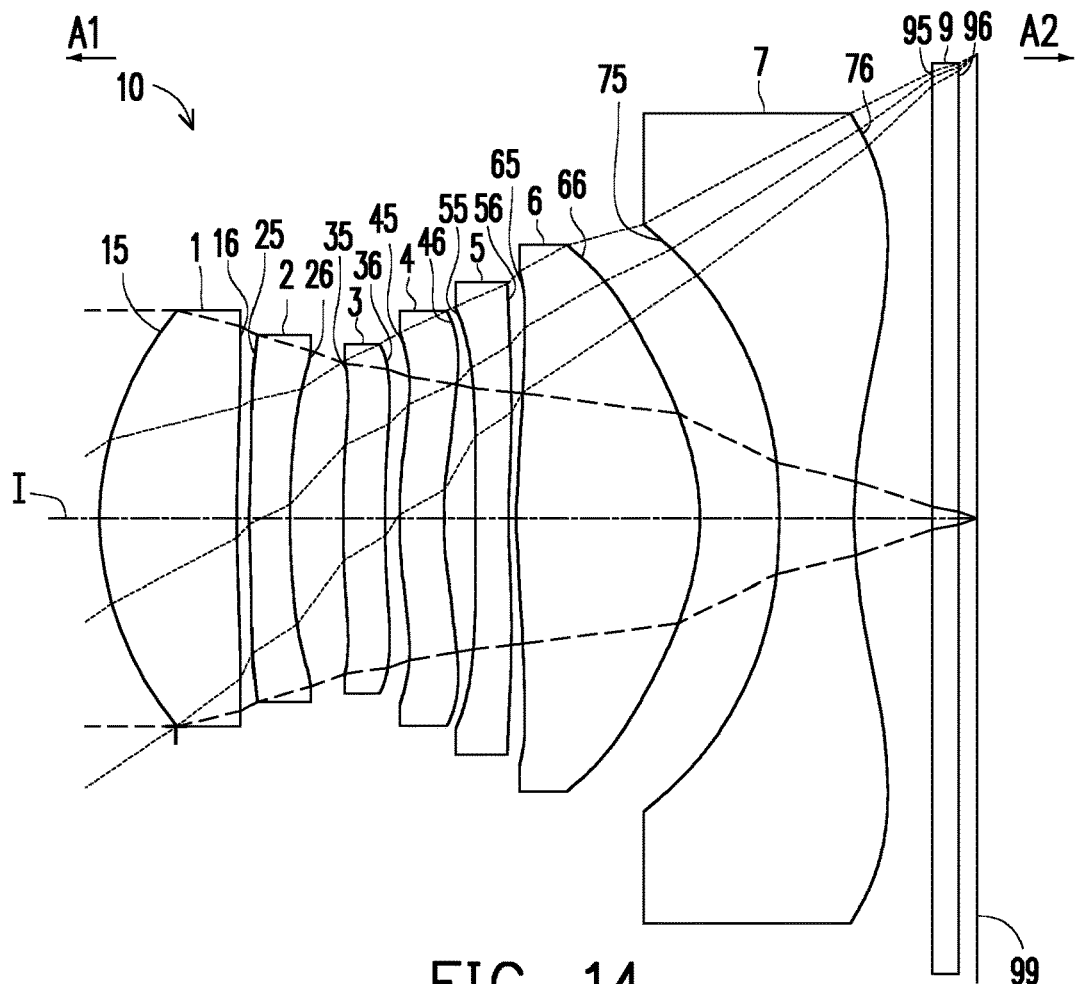
FIG. 14
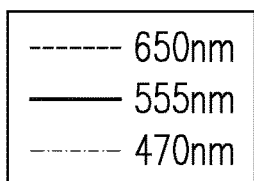
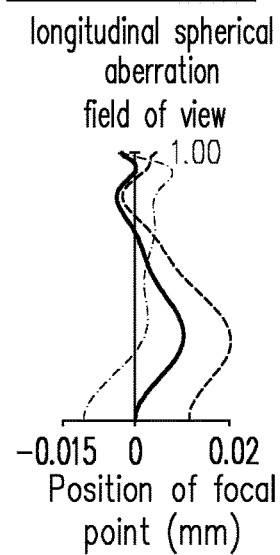
FIG. 15A
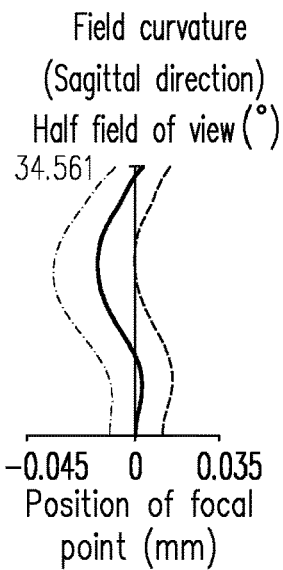
FIG. 15B
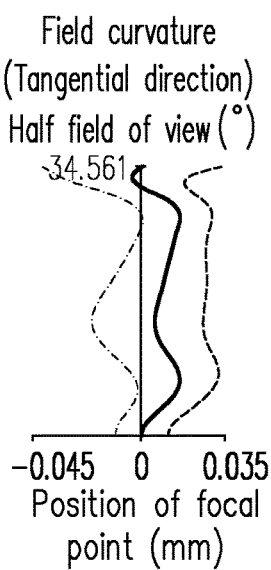
FIG. 15C
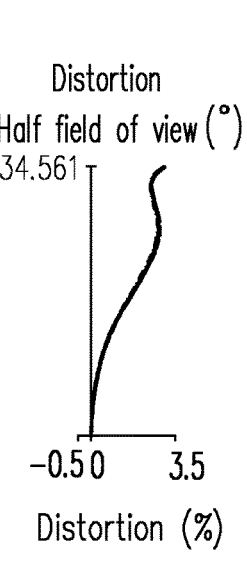
FIG. 15D

| Third embodiment | | | | | | | | |
|---|---|---|---|---|---|---|---|---|
| System length(TTL)= 6.609 mm, Effective focal length(EFL)= 4.928 mm, Half field of view(HFOV)=34.561°, Image height= 3.500 mm, F-number=1.583 | | | | | | | | |
| Element | Surface | Surface type | Radius (mm) | Thickness (mm) | Material | Refractive index (Nd) | Abbe Number | Focal length(mm) |
| Object | | | Infinity | Infinity | | | | |
| Aperture 0 | | | Infinity | -0.577 | | | | |
| First lens element 1 | Object-side surface 15 | Aspheric surface | 2.300 | 1.032 | Plastic | 1.545 | 55.987 | 5.449 |
| | Image-side surface 16 | Aspheric surface | 8.513 | 0.100 | | | | |
| Second lens element 2 | Object-side surface 25 | Aspheric surface | 9.552 | 0.296 | Plastic | 1.661 | 20.373 | -15.644 |
| | Image-side surface 26 | Aspheric surface | 4.926 | 0.407 | | | | |
| Third lens element 3 | Object-side surface 35 | Aspheric surface | 8.382 | 0.316 | Plastic | 1.661 | 20.373 | -38.125 |
| | Image-side surface 36 | Aspheric surface | 6.209 | 0.106 | | | | |
| Fourth lens element 4 | Object-side surface 45 | Aspheric surface | 2.943 | 0.338 | Plastic | 1.661 | 20.373 | 27.896 |
| | Image-side surface 46 | Aspheric surface | 3.334 | 0.232 | | | | |
| Fifth lens element 5 | Object-side surface 55 | Aspheric surface | 44.177 | 0.257 | Plastic | 1.661 | 20.373 | -8.214 |
| | Image-side surface 56 | Aspheric surface | 4.863 | 0.057 | | | | |
| Sixth lens element 6 | Object-side surface 65 | Aspheric surface | 4.515 | 1.379 | Plastic | 1.545 | 55.987 | 2.491 |
| | Image-side surface 66 | Aspheric surface | -1.737 | 0.598 | | | | |
| Seventh lens element 7 | Object-side surface 75 | Aspheric surface | -2.805 | 0.556 | Plastic | 1.545 | 55.987 | -2.723 |
| | Image-side surface 76 | Aspheric surface | 3.388 | 0.589 | | | | |
| Filter 9 | Object-side surface 95 | Aspheric surface | Infinity | 0.210 | | 1.517 | 64.167 | |
| | Image-side surface 96 | Aspheric surface | Infinity | 0.135 | | | | |
| | Image plane 99 | | Infinity | | | | | |

FIG. 16

| Surface | K | $a_2$ | $a_4$ | $a_6$ | $a_8$ |
|---|---|---|---|---|---|
| 15 | 4.613934E-01 | 0.000000E+00 | -5.762178E-03 | 6.852807E-04 | -2.380803E-03 |
| 16 | -8.338151E+01 | 0.000000E+00 | -1.822426E-02 | -1.027343E-02 | 1.964159E-02 |
| 25 | -4.232281E+01 | 0.000000E+00 | -3.417737E-02 | -1.286160E-03 | 2.773501E-02 |
| 26 | 5.792225E+00 | 0.000000E+00 | -1.258085E-02 | -8.209748E-03 | 2.607694E-02 |
| 35 | -9.900000E+01 | 0.000000E+00 | 2.238990E-02 | -4.507023E-02 | 3.483709E-02 |
| 36 | -9.900000E+01 | 0.000000E+00 | -9.527370E-03 | -2.786496E-02 | 3.581537E-02 |
| 45 | -1.911719E+01 | 0.000000E+00 | -1.912049E-02 | -6.533640E-02 | 6.647074E-02 |
| 46 | -1.201775E+01 | 0.000000E+00 | 8.035673E-03 | -8.313067E-02 | 8.822642E-02 |
| 55 | -9.900000E+01 | 0.000000E+00 | -3.369954E-02 | 1.955833E-02 | -2.639010E-02 |
| 56 | -9.900000E+01 | 0.000000E+00 | -8.454044E-02 | 8.784041E-02 | -6.512418E-02 |
| 65 | -9.900000E+01 | 0.000000E+00 | -5.407507E-02 | 6.079422E-02 | -3.839899E-02 |
| 66 | -5.435579E-01 | 0.000000E+00 | 5.724514E-02 | -1.517243E-02 | 3.109096E-03 |
| 75 | -9.621696E+00 | 0.000000E+00 | -5.131602E-04 | -1.852525E-02 | 5.960750E-03 |
| 76 | 0.000000E+00 | 0.000000E+00 | -3.269600E-02 | 2.284372E-03 | 1.939986E-05 |
| Surface | $a_{10}$ | $a_{12}$ | $a_{14}$ | $a_{16}$ | |
| 15 | 7.264329E-04 | -5.258222E-05 | -5.879464E-05 | 0.000000E+00 | |
| 16 | -1.117819E-02 | 2.647632E-03 | -2.125483E-04 | 0.000000E+00 | |
| 25 | -1.889405E-02 | 5.327347E-03 | -4.907453E-04 | 0.000000E+00 | |
| 26 | -2.219091E-02 | 8.933841E-03 | -1.576698E-03 | 0.000000E+00 | |
| 35 | -3.817072E-02 | 2.304325E-02 | -8.340210E-03 | 1.403458E-03 | |
| 36 | -4.398062E-02 | 2.434652E-02 | -7.013923E-03 | 1.066422E-03 | |
| 45 | -3.147981E-02 | 2.926081E-04 | 3.979988E-03 | -7.621038E-04 | |
| 46 | -5.731618E-02 | 2.181342E-02 | -4.699200E-03 | 4.520711E-04 | |
| 55 | 1.848701E-02 | -6.996813E-03 | 1.446671E-03 | -1.392480E-04 | |
| 56 | 2.991574E-02 | -7.671389E-03 | 1.000099E-03 | -5.201256E-05 | |
| 65 | 1.494531E-02 | -3.559519E-03 | 4.473041E-04 | -2.178433E-05 | |
| 66 | 8.451374E-05 | -1.453879E-04 | 1.924783E-05 | -9.863626E-07 | |
| 75 | -9.110681E-04 | 6.915112E-05 | -3.507226E-06 | 2.354991E-07 | |
| 76 | -3.890042E-05 | 3.092746E-06 | -2.728502E-08 | -4.056949E-09 | |

FIG. 17

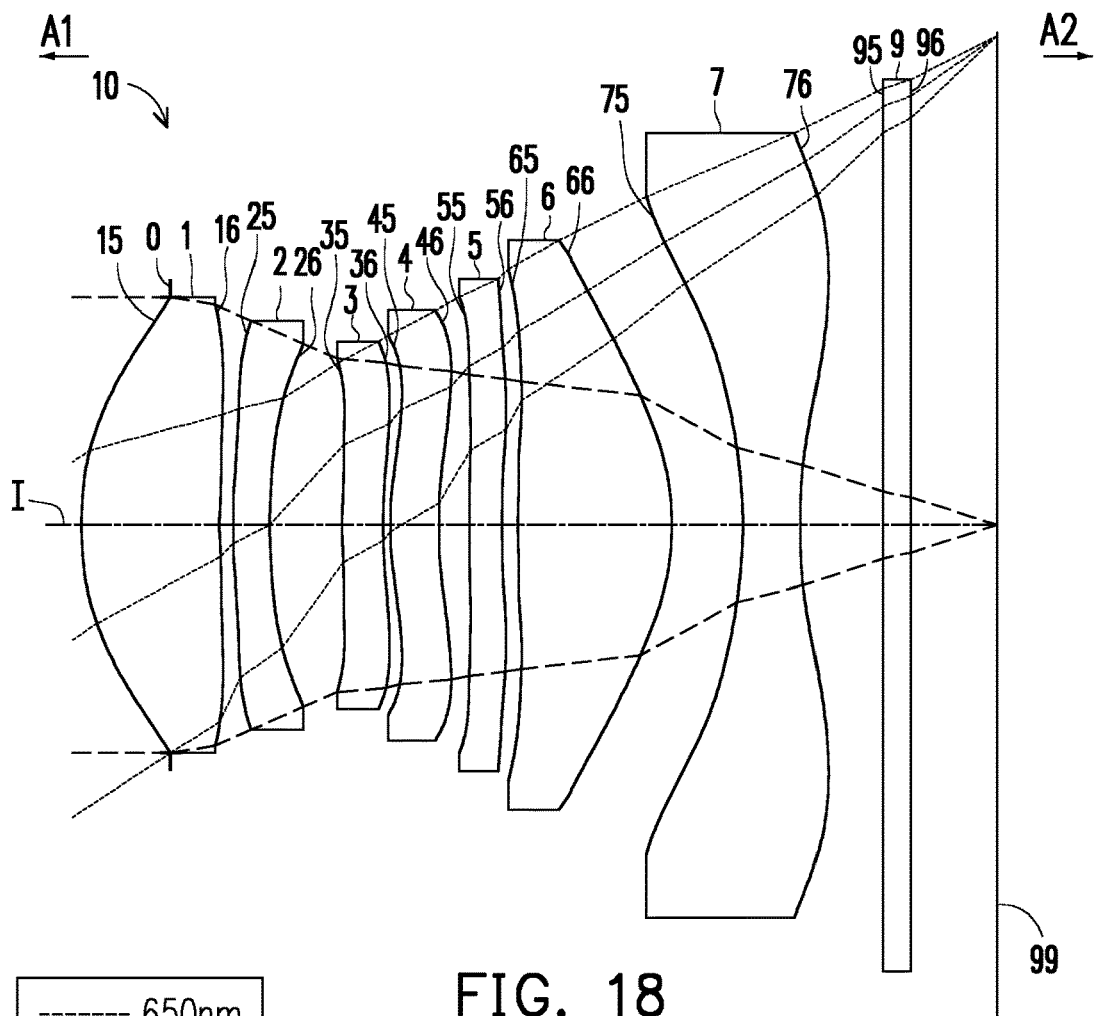
FIG. 18
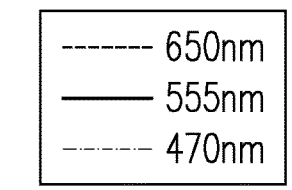
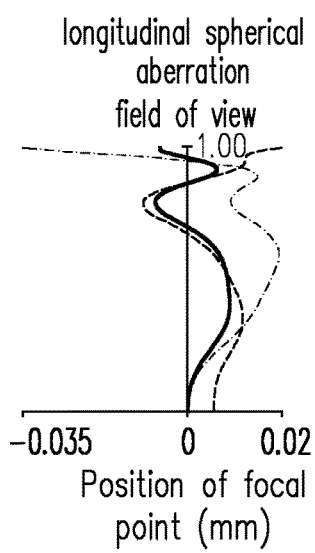
FIG. 19A
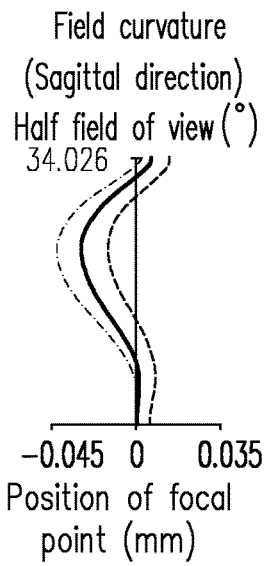
FIG. 19B
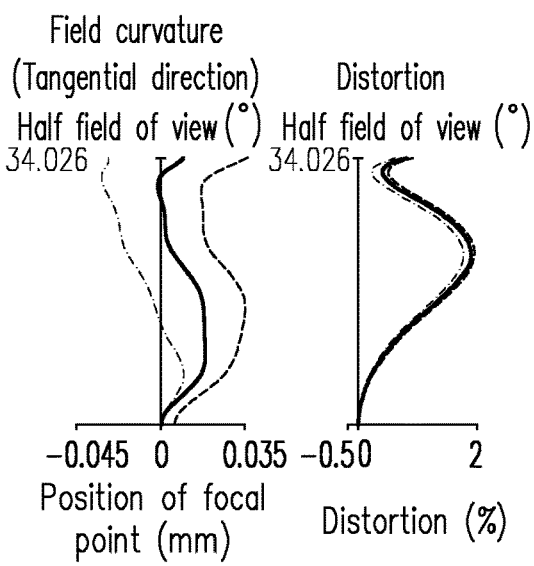
FIG. 19C FIG. 19D

| Fourth embodiment | | | | | | | | |
|---|---|---|---|---|---|---|---|---|
| System length(TTL)= 6.526 mm, Effective focal length(EFL)= 5.145 mm , Half field of view(HFOV)=34.006°, Image height= 3.500 mm, F-number= 1.581 | | | | | | | | |
| Element | Surface | Surface type | Radius (mm) | Thickness (mm) | Material | Refractive index (Nd) | Abbe Number | Focal length(mm) |
| Object | | | Infinity | Infinity | | | | |
| Aperture 0 | | | Infinity | -0.612 | | | | |
| First lens element 1 | Object-side surface 15 | Aspheric surface | 2.202 | 0.980 | Plastic | 1.545 | 55.987 | 4.987 |
| | Image-side surface 16 | Aspheric surface | 9.673 | 0.100 | | | | |
| Second lens element 2 | Object-side surface 25 | Aspheric surface | 7.034 | 0.253 | Plastic | 1.661 | 20.373 | -12.611 |
| | Image-side surface 26 | Aspheric surface | 3.776 | 0.524 | | | | |
| Third lens element 3 | Object-side surface 35 | Aspheric surface | 16.709 | 0.293 | Plastic | 1.661 | 20.373 | -8.425 |
| | Image-side surface 36 | Aspheric surface | 4.176 | 0.048 | | | | |
| Fourth lens element 4 | Object-side surface 45 | Aspheric surface | 2.420 | 0.345 | Plastic | 1.661 | 20.373 | 10.140 |
| | Image-side surface 46 | Aspheric surface | 3.554 | 0.219 | | | | |
| Fifth lens element 5 | Object-side surface 55 | Aspheric surface | 23.927 | 0.234 | Plastic | 1.661 | 20.373 | -9.305 |
| | Image-side surface 56 | Aspheric surface | 4.910 | 0.108 | | | | |
| Sixth lens element 6 | Object-side surface 65 | Aspheric surface | 4.610 | 1.108 | Plastic | 1.545 | 55.987 | 2.331 |
| | Image-side surface 66 | Aspheric surface | -1.610 | 0.503 | | | | |
| Seventh lens element 7 | Object-side surface 75 | Aspheric surface | -3.083 | 0.406 | Plastic | 1.545 | 55.987 | -2.839 |
| | Image-side surface 76 | Aspheric surface | 3.266 | 0.589 | | | | |
| Filter 9 | Object-side surface 95 | Aspheric surface | Infinity | 0.210 | | 1.517 | 64.167 | |
| | Image-side surface 96 | Aspheric surface | Infinity | 0.607 | | | | |
| | Image plane 99 | | Infinity | | | | | |

FIG. 20

| Surface | K | $a_2$ | $a_4$ | $a_6$ | $a_8$ |
|---|---|---|---|---|---|
| 15 | 3.952099E-01 | 0.000000E+00 | -6.149776E-03 | -4.597911E-04 | -2.495422E-03 |
| 16 | -1.382361E+02 | 0.000000E+00 | -1.784909E-02 | -1.139867E-02 | 1.922939E-02 |
| 25 | -2.422036E+01 | 0.000000E+00 | -3.417946E-02 | -4.728741E-04 | 2.856245E-02 |
| 26 | 4.040641E+00 | 0.000000E+00 | -1.960999E-02 | -6.857945E-03 | 2.669062E-02 |
| 35 | -9.900000E+01 | 0.000000E+00 | 6.937657E-03 | -4.714256E-02 | 3.635705E-02 |
| 36 | -9.900000E+01 | 0.000000E+00 | -1.135250E-02 | -2.882064E-02 | 3.673537E-02 |
| 45 | -2.531563E+01 | 0.000000E+00 | -2.475633E-02 | -6.347289E-02 | 6.640159E-02 |
| 46 | -1.339841E+01 | 0.000000E+00 | 2.532126E-04 | -8.279031E-02 | 8.871671E-02 |
| 55 | -9.899987E+01 | 0.000000E+00 | -2.165274E-02 | 2.237962E-02 | -2.706004E-02 |
| 56 | -9.900000E+01 | 0.000000E+00 | -8.485606E-02 | 8.734160E-02 | -6.514449E-02 |
| 65 | -9.900000E+01 | 0.000000E+00 | -6.803646E-02 | 6.149739E-02 | -3.860385E-02 |
| 66 | -6.560669E-01 | 0.000000E+00 | 6.590032E-02 | -1.446161E-02 | 3.211445E-03 |
| 75 | -1.424662E+01 | 0.000000E+00 | 6.296231E-03 | -1.818738E-02 | 6.061773E-03 |
| 76 | 0.000000E+00 | 0.000000E+00 | -4.088375E-02 | 2.980711E-03 | -1.518212E-05 |
| Surface | $a_{10}$ | $a_{12}$ | $a_{14}$ | $a_{16}$ | |
| 15 | 7.336457E-04 | -7.499099E-05 | -9.032992E-05 | 0.000000E+00 | |
| 16 | -1.104744E-02 | 2.729445E-03 | -2.650610E-04 | 0.000000E+00 | |
| 25 | -1.883861E-02 | 5.232714E-03 | -4.644217E-04 | 0.000000E+00 | |
| 26 | -2.226378E-02 | 8.930657E-03 | -1.576704E-03 | 0.000000E+00 | |
| 35 | -3.746353E-02 | 2.299839E-02 | -8.340209E-03 | 1.403458E-03 | |
| 36 | -4.363120E-02 | 2.382725E-02 | -7.014153E-03 | 1.066422E-03 | |
| 45 | -3.170720E-02 | 1.968070E-04 | 3.820582E-03 | -7.621038E-04 | |
| 46 | -5.730718E-02 | 2.177736E-02 | -4.712493E-03 | 4.464950E-04 | |
| 55 | 1.818877E-02 | -7.048539E-03 | 1.449588E-03 | -1.307556E-04 | |
| 56 | 2.989191E-02 | -7.679130E-03 | 1.000865E-03 | -4.997578E-05 | |
| 65 | 1.498616E-02 | -3.535039E-03 | 4.514692E-04 | -2.243567E-05 | |
| 66 | 8.269063E-05 | -1.443401E-04 | 1.909637E-05 | -1.150059E-06 | |
| 75 | -8.940677E-04 | 7.202324E-05 | -3.429608E-06 | 9.300333E-08 | |
| 76 | -4.040674E-05 | 3.302004E-06 | -8.971340E-10 | -3.830154E-09 | |

FIG. 21

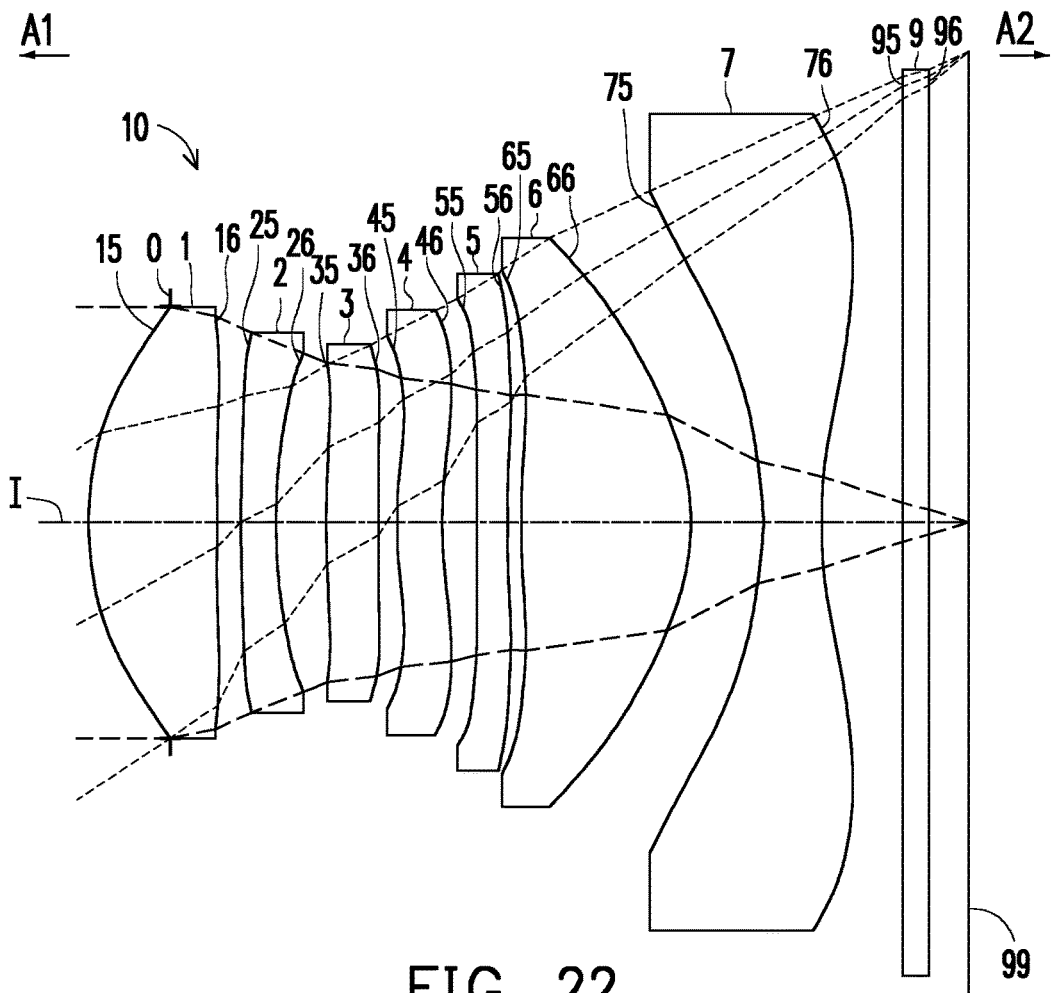
FIG. 22
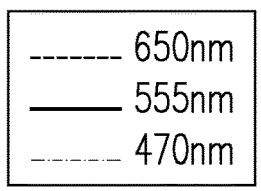
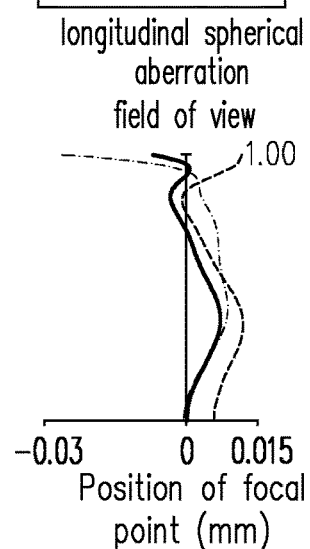
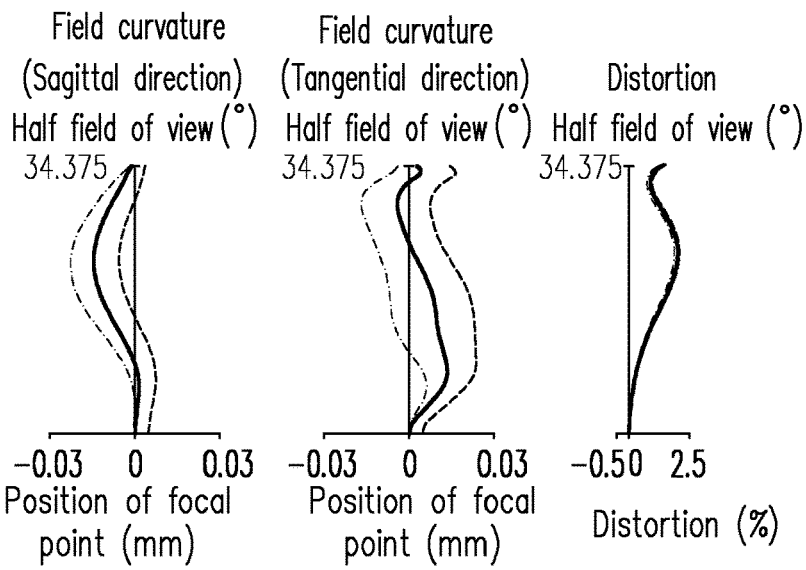
FIG. 23A  FIG. 23B  FIG. 23C  FIG. 23D

| Fifth embodiment | | | | | | | | |
|---|---|---|---|---|---|---|---|---|
| System length(TTL)= 6.535 mm, Effective focal length(EFL)= 5.044 mm, Half field of view(HFOV)=34.375°, Image height= 3.500 mm, F-number= 1.581 | | | | | | | | |
| Element | Surface | Surface type | Radius (mm) | Thickness (mm) | Material | Refractive index (Nd) | Abbe Number | Focal length(mm) |
| Object | | | Infinity | Infinity | | | | |
| Aperture 0 | | | Infinity | −0.608 | | | | |
| First lens element 1 | Object-side surface 15 | Aspheric surface | 2.222 | 0.947 | Plastic | 1.545 | 55.987 | 4.734 |
| | Image-side surface 16 | Aspheric surface | 13.402 | 0.184 | | | | |
| Second lens element 2 | Object-side surface 25 | Aspheric surface | 9.447 | 0.266 | Plastic | 1.661 | 20.373 | −9.885 |
| | Image-side surface 26 | Aspheric surface | 3.840 | 0.374 | | | | |
| Third lens element 3 | Object-side surface 35 | Aspheric surface | 11.743 | 0.381 | Plastic | 1.661 | 20.373 | 253.626 |
| | Image-side surface 36 | Aspheric surface | 12.455 | 0.146 | | | | |
| Fourth lens element 4 | Object-side surface 45 | Aspheric surface | 3.885 | 0.331 | Plastic | 1.661 | 20.373 | 168.248 |
| | Image-side surface 46 | Aspheric surface | 3.887 | 0.260 | | | | |
| Fifth lens element 5 | Object-side surface 55 | Aspheric surface | 39.258 | 0.220 | Plastic | 1.661 | 20.373 | −8.344 |
| | Image-side surface 56 | Aspheric surface | 4.864 | 0.102 | | | | |
| Sixth lens element 6 | Object-side surface 65 | Aspheric surface | 4.683 | 1.264 | Plastic | 1.545 | 55.987 | 2.391 |
| | Image-side surface 66 | Aspheric surface | −1.639 | 0.534 | | | | |
| Seventh lens element 7 | Object-side surface 75 | Aspheric surface | −2.705 | 0.433 | Plastic | 1.545 | 55.987 | −2.662 |
| | Image-side surface 76 | Aspheric surface | 3.322 | 0.589 | | | | |
| Filter 9 | Object-side surface 95 | Aspheric surface | Infinity | 0.210 | | 1.517 | 64.167 | |
| | Image-side surface 96 | Aspheric surface | Infinity | 0.294 | | | | |
| | Image plane 99 | | Infinity | | | | | |

FIG. 24

| Surface | K | $a_2$ | $a_4$ | $a_6$ | $a_8$ |
|---|---|---|---|---|---|
| 15 | 4.220326E-01 | 0.000000E+00 | -4.974091E-03 | -3.217959E-03 | 2.079045E-03 |
| 16 | -9.900000E+01 | 0.000000E+00 | -1.646185E-02 | 1.844082E-03 | 4.707638E-03 |
| 25 | -2.422036E+01 | 0.000000E+00 | -4.229088E-02 | 2.098428E-02 | 4.694535E-03 |
| 26 | 3.697727E+00 | 0.000000E+00 | -3.370219E-02 | 1.071298E-02 | 4.691432E-03 |
| 35 | -9.900000E+01 | 0.000000E+00 | 1.575509E-02 | -4.417819E-02 | 3.601949E-02 |
| 36 | -9.900000E+01 | 0.000000E+00 | -1.242949E-02 | -2.860283E-02 | 3.791311E-02 |
| 45 | -2.880225E+01 | 0.000000E+00 | -3.227304E-02 | -6.542936E-02 | 6.648941E-02 |
| 46 | -1.704322E+01 | 0.000000E+00 | -3.679190E-03 | -8.233856E-02 | 8.898013E-02 |
| 55 | -9.900000E+01 | 0.000000E+00 | -2.815232E-02 | 2.236158E-02 | -2.670600E-02 |
| 56 | -9.900000E+01 | 0.000000E+00 | -8.601473E-02 | 8.767381E-02 | -6.513579E-02 |
| 65 | -9.900000E+01 | 0.000000E+00 | -7.165233E-02 | 6.110449E-02 | -3.865951E-02 |
| 66 | -6.276978E-01 | 0.000000E+00 | 6.153516E-02 | -1.624628E-02 | 3.143895E-03 |
| 75 | -1.020378E+01 | 0.000000E+00 | 6.989929E-03 | -1.818645E-02 | 6.046444E-03 |
| 76 | 0.000000E+00 | 0.000000E+00 | -3.574549E-02 | 2.609725E-03 | -2.362296E-05 |
| Surface | $a_{10}$ | $a_{12}$ | $a_{14}$ | $a_{16}$ | |
| 15 | -2.420379E-03 | 9.969101E-04 | -2.224282E-04 | 0.000000E+00 | |
| 16 | -4.205608E-03 | 1.247447E-03 | -1.451953E-04 | 0.000000E+00 | |
| 25 | -5.503876E-03 | 1.437396E-03 | 8.288867E-06 | 0.000000E+00 | |
| 26 | -4.211982E-03 | 7.532405E-04 | 5.186970E-05 | 0.000000E+00 | |
| 35 | -3.810710E-02 | 2.313900E-02 | -8.340209E-03 | 1.403458E-03 | |
| 36 | -4.288179E-02 | 2.377183E-02 | -7.014153E-03 | 1.066422E-03 | |
| 45 | -3.119983E-02 | 6.573972E-04 | 3.820582E-03 | -7.621038E-04 | |
| 46 | -5.719266E-02 | 2.183827E-02 | -4.702500E-03 | 4.456433E-04 | |
| 55 | 1.829565E-02 | -7.054222E-03 | 1.435967E-03 | -1.346302E-04 | |
| 56 | 2.986617E-02 | -7.687198E-03 | 9.987266E-04 | -5.054402E-05 | |
| 65 | 1.500226E-02 | -3.530434E-03 | 4.510687E-04 | -2.311263E-05 | |
| 66 | 8.337915E-05 | -1.425621E-04 | 1.991227E-05 | -8.633564E-07 | |
| 75 | -8.977863E-04 | 7.156028E-05 | -3.449019E-06 | 1.032229E-07 | |
| 76 | -3.815411E-05 | 3.426981E-06 | -1.251841E-08 | -7.068791E-09 | |

FIG. 25

| Sixth embodiment | | | | | | | | |
|---|---|---|---|---|---|---|---|---|
| System length(TTL)= 6.609 mm, Effective focal length(EFL)= 4.909 mm , Half field of view(HFOV)=35.096°, Image height= 3.500 mm, F-number= 1.584 | | | | | | | | |
| Element | Surface | Surface type | Radius (mm) | Thickness (mm) | Material | Refractive index (Nd) | Abbe Number | Focal length(mm) |
| Object | | | Infinity | Infinity | | | | |
| Aperture 0 | | | Infinity | -0.591 | | | | |
| First lens element 1 | Object-side surface 15 | Aspheric surface | 2.246 | 0.930 | Plastic | 1.545 | 55.987 | 5.173 |
| | Image-side surface 16 | Aspheric surface | 9.348 | 0.076 | | | | |
| Second lens element 2 | Object-side surface 25 | Aspheric surface | 7.586 | 0.243 | Plastic | 1.661 | 20.373 | -14.523 |
| | Image-side surface 26 | Aspheric surface | 4.200 | 0.552 | | | | |
| Third lens element 3 | Object-side surface 35 | Aspheric surface | 9.199 | 0.348 | Plastic | 1.661 | 20.373 | -707.888 |
| | Image-side surface 36 | Aspheric surface | 8.887 | 0.114 | | | | |
| Fourth lens element 4 | Object-side surface 45 | Aspheric surface | 3.392 | 0.308 | Plastic | 1.661 | 20.373 | 149.957 |
| | Image-side surface 46 | Aspheric surface | 3.383 | 0.179 | | | | |
| Fifth lens element 5 | Object-side surface 55 | Aspheric surface | 45.172 | 0.306 | Plastic | 1.661 | 20.373 | -8.102 |
| | Image-side surface 56 | Aspheric surface | 4.814 | 0.065 | | | | |
| Sixth lens element 6 | Object-side surface 65 | Aspheric surface | 4.577 | 1.536 | Plastic | 1.545 | 55.987 | 2.499 |
| | Image-side surface 66 | Aspheric surface | -1.715 | 0.667 | | | | |
| Seventh lens element 7 | Object-side surface 75 | Aspheric surface | -2.455 | 0.447 | Plastic | 1.545 | 55.987 | -2.557 |
| | Image-side surface 76 | Aspheric surface | 3.447 | 0.589 | | | | |
| Filter 9 | Object-side surface 95 | Aspheric surface | Infinity | 0.210 | | 1.517 | 64.167 | |
| | Image-side surface 96 | Aspheric surface | Infinity | 0.040 | | | | |
| | Image plane 99 | | Infinity | | | | | |

FIG. 28

| Surface | K | $a_2$ | $a_4$ | $a_6$ | $a_8$ |
|---|---|---|---|---|---|
| 15 | 4.506529E-01 | 0.000000E+00 | -4.484888E-03 | 1.462140E-04 | -2.216678E-03 |
| 16 | -1.248879E+02 | 0.000000E+00 | -1.554957E-02 | -1.025252E-02 | 1.936959E-02 |
| 25 | -2.497376E+01 | 0.000000E+00 | -3.462006E-02 | -1.558047E-03 | 2.800140E-02 |
| 26 | 4.971298E+00 | 0.000000E+00 | -1.659514E-02 | -8.248772E-03 | 2.609990E-02 |
| 35 | -9.900000E+01 | 0.000000E+00 | 1.835643E-02 | -4.478124E-02 | 3.596357E-02 |
| 36 | -9.900000E+01 | 0.000000E+00 | -1.623254E-02 | -2.916865E-02 | 3.666178E-02 |
| 45 | -2.237440E+01 | 0.000000E+00 | -2.263428E-02 | -6.664360E-02 | 6.541657E-02 |
| 46 | -1.342090E+01 | 0.000000E+00 | 7.889770E-03 | -8.330481E-02 | 8.776258E-02 |
| 55 | -9.900000E+01 | 0.000000E+00 | -3.097220E-02 | 2.013884E-02 | -2.686832E-02 |
| 56 | -9.900000E+01 | 0.000000E+00 | -7.655514E-02 | 8.759762E-02 | -6.523795E-02 |
| 65 | -9.900000E+01 | 0.000000E+00 | -5.359223E-02 | 6.148300E-02 | -3.861029E-02 |
| 66 | -4.968562E-01 | 0.000000E+00 | 5.561919E-02 | -1.445269E-02 | 2.990981E-03 |
| 75 | -8.383805E+00 | 0.000000E+00 | 2.294021E-03 | -1.861991E-02 | 5.965284E-03 |
| 76 | 0.000000E+00 | 0.000000E+00 | -2.984116E-02 | 1.846292E-03 | 8.731020E-05 |
| Surface | $a_{10}$ | $a_{12}$ | $a_{14}$ | $a_{16}$ | |
| 15 | 7.571786E-04 | -7.888779E-05 | -8.298703E-05 | 0.000000E+00 | |
| 16 | -1.118063E-02 | 2.685253E-03 | -2.201416E-04 | 0.000000E+00 | |
| 25 | -1.880835E-02 | 5.333023E-03 | -4.676835E-04 | 0.000000E+00 | |
| 26 | -2.208411E-02 | 9.065057E-03 | -1.576698E-03 | 0.000000E+00 | |
| 35 | -3.792943E-02 | 2.258259E-02 | -8.340210E-03 | 1.403458E-03 | |
| 36 | -4.379419E-02 | 2.402323E-02 | -7.013923E-03 | 1.066422E-03 | |
| 45 | -3.165853E-02 | 3.979823E-04 | 3.979988E-03 | -7.621038E-04 | |
| 46 | -5.758899E-02 | 2.173513E-02 | -4.705422E-03 | 4.571383E-04 | |
| 55 | 1.830841E-02 | -7.038582E-03 | 1.440197E-03 | -1.364974E-04 | |
| 56 | 2.988232E-02 | -7.677484E-03 | 1.000208E-03 | -5.129994E-05 | |
| 65 | 1.491444E-02 | -3.558839E-03 | 4.479608E-04 | -2.196578E-05 | |
| 66 | 9.900775E-05 | -1.360016E-04 | 1.987859E-05 | -1.492810E-06 | |
| 75 | -9.063199E-04 | 7.047104E-05 | -3.532307E-06 | 1.181953E-07 | |
| 76 | -4.108391E-05 | 2.843790E-06 | -2.818363E-08 | -3.393539E-09 | |

FIG. 29

| Seventh embodiment | | | | | | | | |
|---|---|---|---|---|---|---|---|---|
| System length(TTL)=6.303 mm, Effective focal length(EFL)=4.951 mm , Half field of view(HFOV)=34.675°, Image height= 3.500 mm, F-number=1.587 | | | | | | | | |
| Element | Surface | Surface type | Radius (mm) | Thickness (mm) | Material | Refractive index (Nd) | Abbe Number | Focal length(mm) |
| Object | | | Infinity | Infinity | | | | |
| Aperture 0 | | | Infinity | -0.590 | | | | |
| First lens element 1 | Object-side surface 15 | Aspheric surface | 2.175 | 1.002 | Plastic | 1.545 | 55.987 | 4.791 |
| | Image-side surface 16 | Aspheric surface | 10.789 | 0.075 | | | | |
| Second lens element 2 | Object-side surface 25 | Aspheric surface | 7.361 | 0.290 | Plastic | 1.661 | 20.373 | -11.381 |
| | Image-side surface 26 | Aspheric surface | 3.678 | 0.580 | | | | |
| Third lens element 3 | Object-side surface 35 | Aspheric surface | 8.863 | 0.318 | Plastic | 1.661 | 20.373 | -636.458 |
| | Image-side surface 36 | Aspheric surface | 8.557 | 0.109 | | | | |
| Fourth lens element 4 | Object-side surface 45 | Aspheric surface | 3.424 | 0.349 | Plastic | 1.661 | 20.373 | 28.185 |
| | Image-side surface 46 | Aspheric surface | 4.015 | 0.296 | | | | |
| Fifth lens element 5 | Object-side surface 55 | Aspheric surface | 251.215 | 0.220 | Plastic | 1.661 | 20.373 | -9.280 |
| | Image-side surface 56 | Aspheric surface | 6.040 | 0.109 | | | | |
| Sixth lens element 6 | Object-side surface 65 | Aspheric surface | 5.767 | 1.054 | Plastic | 1.545 | 55.987 | 2.702 |
| | Image-side surface 66 | Aspheric surface | -1.856 | 0.532 | | | | |
| Seventh lens element 7 | Object-side surface 75 | Aspheric surface | -2.609 | 0.492 | Plastic | 1.545 | 55.987 | -2.669 |
| | Image-side surface 76 | Aspheric surface | 3.526 | 0.589 | | | | |
| Filter 9 | Object-side surface 95 | Aspheric surface | Infinity | 0.210 | | 1.517 | 64.167 | |
| | Image-side surface 96 | Aspheric surface | Infinity | 0.079 | | | | |
| | Image plane 99 | | Infinity | | | | | |

FIG. 32

| Surface | K | $a_2$ | $a_4$ | $a_6$ | $a_8$ |
|---|---|---|---|---|---|
| 15 | 3.972832E-01 | 0.000000E+00 | -5.646464E-03 | -5.530548E-04 | -2.413674E-03 |
| 16 | -1.779973E+02 | 0.000000E+00 | -1.680697E-02 | -1.111508E-02 | 1.910165E-02 |
| 25 | -2.136809E+01 | 0.000000E+00 | -3.431648E-02 | -1.038209E-03 | 2.845183E-02 |
| 26 | 4.614777E+00 | 0.000000E+00 | -1.857004E-02 | -7.293320E-03 | 2.708142E-02 |
| 35 | -9.900000E+01 | 0.000000E+00 | 2.030429E-02 | -4.519868E-02 | 3.660996E-02 |
| 36 | -9.900000E+01 | 0.000000E+00 | -1.880769E-02 | -2.771533E-02 | 3.694097E-02 |
| 45 | -2.050765E+01 | 0.000000E+00 | -1.949348E-02 | -6.502554E-02 | 6.601580E-02 |
| 46 | -1.217816E+01 | 0.000000E+00 | 3.547698E-03 | -8.270371E-02 | 8.834510E-02 |
| 55 | -9.900000E+01 | 0.000000E+00 | -2.654167E-02 | 2.078192E-02 | -2.707047E-02 |
| 56 | -9.900000E+01 | 0.000000E+00 | -8.185539E-02 | 8.762620E-02 | -6.512677E-02 |
| 65 | -9.900000E+01 | 0.000000E+00 | -6.291138E-02 | 6.202576E-02 | -3.838985E-02 |
| 66 | -6.014837E-01 | 0.000000E+00 | 5.891184E-02 | -1.365096E-02 | 2.947212E-03 |
| 75 | -8.876076E+00 | 0.000000E+00 | 7.524652E-03 | -1.765907E-02 | 6.069147E-03 |
| 76 | 0.000000E+00 | 0.000000E+00 | -3.193129E-02 | 2.367537E-03 | 2.649146E-05 |
| Surface | $a_{10}$ | $a_{12}$ | $a_{14}$ | $a_{16}$ | |
| 15 | 7.153811E-04 | -9.792949E-05 | -9.945414E-05 | 0.000000E+00 | |
| 16 | -1.116646E-02 | 2.703303E-03 | -2.429172E-04 | 0.000000E+00 | |
| 25 | -1.872225E-02 | 5.303470E-03 | -4.813535E-04 | 0.000000E+00 | |
| 26 | -2.180821E-02 | 9.029360E-03 | -1.576698E-03 | 0.000000E+00 | |
| 35 | -3.768142E-02 | 2.246081E-02 | -8.340210E-03 | 1.403458E-03 | |
| 36 | -4.386357E-02 | 2.380212E-02 | -7.013923E-03 | 1.066422E-03 | |
| 45 | -3.142175E-02 | 4.564352E-04 | 3.937290E-03 | -7.621038E-04 | |
| 46 | -5.744171E-02 | 2.176640E-02 | -4.697486E-03 | 4.581015E-04 | |
| 55 | 1.825039E-02 | -7.039364E-03 | 1.447383E-03 | -1.305818E-04 | |
| 56 | 2.990659E-02 | -7.673849E-03 | 1.000319E-03 | -5.160139E-05 | |
| 65 | 1.499196E-02 | -3.544519E-03 | 4.480509E-04 | -2.308446E-05 | |
| 66 | 6.930088E-05 | -1.398053E-04 | 2.031792E-05 | -1.052667E-06 | |
| 75 | -8.969638E-04 | 7.153502E-05 | -3.489198E-06 | 8.258378E-08 | |
| 76 | -4.000218E-05 | 3.182541E-06 | -1.170004E-08 | -5.352818E-09 | |

FIG. 33

- - - - - - 650nm
———— 555nm
— · — · — 470nm longitudinal spherical
aberration
field of view -0.025 0 0.015
Position of focal
point (mm)

Field curvature
(Sagittal direction)
Half field of view (°)
34.558

-0.025 0 0.025
Position of focal
point (mm)

Field curvature
(Tangential direction)
Half field of view (°)
34.558

-0.025 0 0.025
Position of focal
point (mm)

Distortion
Half field of view (°)
34.558

-0.5 0 2.5
Distortion (%)

| Eighth embodiment |||||||||
|---|---|---|---|---|---|---|---|---|
| System length(TTL)= 6.458 mm, Effective focal length(EFL)= 5.002 mm, Half field of view(HFOV)=34.558°, Image height= 3.500 mm, F-number= 1.581 |||||||||
| Element | Surface | Surface type | Radius (mm) | Thickness (mm) | Material | Refractive index (Nd) | Abbe Number | Focal length(mm) |
| Object | | | Infinity | Infinity | | | | |
| Aperture 0 | | | Infinity | -0.609 | | | | |
| First lens element 1 | Object-side surface 15 | Aspheric surface | 2.188 | 1.001 | Plastic | 1.545 | 55.987 | 4.520 |
| | Image-side surface 16 | Aspheric surface | 16.103 | 0.126 | | | | |
| Second lens element 2 | Object-side surface 25 | Aspheric surface | 9.798 | 0.245 | Plastic | 1.661 | 20.373 | -10.142 |
| | Image-side surface 26 | Aspheric surface | 3.962 | 0.495 | | | | |
| Third lens element 3 | Object-side surface 35 | Aspheric surface | 15.246 | 0.316 | Plastic | 1.642 | 22.409 | -26.391 |
| | Image-side surface 36 | Aspheric surface | 7.991 | 0.091 | | | | |
| Fourth lens element 4 | Object-side surface 45 | Aspheric surface | 3.329 | 0.390 | Plastic | 1.642 | 22.409 | 30.347 |
| | Image-side surface 46 | Aspheric surface | 3.823 | 0.185 | | | | |
| Fifth lens element 5 | Object-side surface 55 | Aspheric surface | 29.743 | 0.282 | Plastic | 1.642 | 22.409 | -7.123 |
| | Image-side surface 56 | Aspheric surface | 3.977 | 0.083 | | | | |
| Sixth lens element 6 | Object-side surface 65 | Aspheric surface | 3.886 | 1.209 | Plastic | 1.545 | 55.987 | 2.337 |
| | Image-side surface 66 | Aspheric surface | -1.692 | 0.539 | | | | |
| Seventh lens element 7 | Object-side surface 75 | Aspheric surface | -2.878 | 0.435 | Plastic | 1.545 | 55.987 | -2.740 |
| | Image-side surface 76 | Aspheric surface | 3.287 | 0.589 | | | | |
| Filter 9 | Object-side surface 95 | Aspheric surface | Infinity | 0.210 | | 1.517 | 64.167 | |
| | Image-side surface 96 | Aspheric surface | Infinity | 0.261 | | | | |
| | Image plane 99 | | Infinity | | | | | |

FIG. 36

| Surface | K | $a_2$ | $a_4$ | $a_6$ | $a_8$ |
|---|---|---|---|---|---|
| 15 | 4.083483E-01 | 0.000000E+00 | -5.429545E-03 | -1.567609E-03 | -2.390537E-04 |
| 16 | -1.382361E+02 | 0.000000E+00 | -2.468698E-02 | 7.016737E-03 | 4.630209E-03 |
| 25 | -2.422036E+01 | 0.000000E+00 | -5.089962E-02 | 2.992561E-02 | 3.874005E-03 |
| 26 | 4.136468E+00 | 0.000000E+00 | -3.666301E-02 | 1.390767E-02 | 1.321976E-02 |
| 35 | -9.900000E+01 | 0.000000E+00 | 1.147701E-02 | -4.646239E-02 | 3.633911E-02 |
| 36 | -9.900000E+01 | 0.000000E+00 | -1.344109E-02 | -2.883699E-02 | 3.701069E-02 |
| 45 | -2.364262E+01 | 0.000000E+00 | -2.653432E-02 | -6.488811E-02 | 6.594186E-02 |
| 46 | -1.132403E+01 | 0.000000E+00 | 1.969153E-03 | -8.276386E-02 | 8.858637E-02 |
| 55 | -9.900000E+01 | 0.000000E+00 | -2.296572E-02 | 2.213959E-02 | -2.701776E-02 |
| 56 | -9.900000E+01 | 0.000000E+00 | -8.372481E-02 | 8.757409E-02 | -6.519169E-02 |
| 65 | -9.900000E+01 | 0.000000E+00 | -6.799447E-02 | 6.184119E-02 | -3.847146E-02 |
| 66 | -6.236576E-01 | 0.000000E+00 | 6.156367E-02 | -1.510963E-02 | 3.155098E-03 |
| 75 | -1.078307E+01 | 0.000000E+00 | 4.841112E-03 | -1.828211E-02 | 6.045599E-03 |
| 76 | 0.000000E+00 | 0.000000E+00 | -3.753646E-02 | 2.790425E-03 | -2.873459E-05 |
| Surface | $a_{10}$ | $a_{12}$ | $a_{14}$ | $a_{16}$ | |
| 15 | -9.666055E-04 | 5.295335E-04 | -1.720423E-04 | 0.000000E+00 | |
| 16 | -5.792310E-03 | 2.003397E-03 | -2.545202E-04 | 0.000000E+00 | |
| 25 | -9.258235E-03 | 3.820708E-03 | -4.457335E-04 | 0.000000E+00 | |
| 26 | -1.808640E-02 | 8.892828E-03 | -1.622308E-03 | 0.000000E+00 | |
| 35 | -3.748210E-02 | 2.303455E-02 | -8.340209E-03 | 1.403458E-03 | |
| 36 | -4.346767E-02 | 2.386040E-02 | -7.014153E-03 | 1.066422E-03 | |
| 45 | -3.174039E-02 | 2.700813E-02 | 3.820582E-03 | -7.621038E-04 | |
| 46 | -5.732984E-02 | 2.178018E-02 | -4.718106E-03 | 4.450189E-04 | |
| 55 | 1.816676E-02 | -7.072504E-03 | 1.440363E-03 | -1.318852E-04 | |
| 56 | 2.987082E-02 | -7.683579E-03 | 9.995865E-04 | -5.045138E-05 | |
| 65 | 1.500379E-02 | -3.536441E-03 | 4.497883E-04 | -2.307494E-05 | |
| 66 | 8.105257E-05 | -1.424310E-04 | 1.981480E-05 | -9.949309E-07 | |
| 75 | -8.981822E-04 | 7.134338E-05 | -3.485045E-06 | 1.011470E-07 | |
| 76 | -4.009470E-05 | 3.336282E-06 | -7.762257E-09 | -6.032386E-09 | |

FIG. 37

| Condition | First embodiment | Second embodiment | Third embodiment | Fourth embodiment |
|---|---|---|---|---|
| T1 | 1.004 | 0.963 | 1.032 | 0.980 |
| G12 | 0.128 | 0.105 | 0.100 | 0.100 |
| T2 | 0.244 | 0.370 | 0.296 | 0.253 |
| G23 | 0.500 | 0.405 | 0.407 | 0.524 |
| T3 | 0.298 | 0.387 | 0.316 | 0.293 |
| G34 | 0.075 | 0.102 | 0.106 | 0.048 |
| T4 | 0.387 | 0.342 | 0.338 | 0.345 |
| G45 | 0.201 | 0.204 | 0.232 | 0.219 |
| T5 | 0.273 | 0.315 | 0.257 | 0.234 |
| G56 | 0.088 | 0.070 | 0.057 | 0.108 |
| T6 | 1.122 | 1.452 | 1.379 | 1.108 |
| G67 | 0.525 | 0.601 | 0.598 | 0.503 |
| T7 | 0.455 | 0.500 | 0.556 | 0.406 |
| G7F | 0.589 | 0.589 | 0.589 | 0.589 |
| TF | 0.210 | 0.210 | 0.210 | 0.210 |
| GFP | 0.363 | 0.040 | 0.135 | 0.607 |
| V1 | 55.987 | 55.987 | 55.987 | 55.987 |
| V2 | 20.373 | 20.373 | 20.373 | 20.373 |
| V3 | 20.373 | 20.373 | 20.373 | 20.373 |
| V4 | 20.373 | 20.373 | 20.373 | 20.373 |
| V5 | 20.373 | 20.373 | 20.373 | 20.373 |
| V6 | 55.987 | 55.987 | 55.987 | 55.987 |
| V7 | 55.987 | 55.987 | 55.987 | 55.987 |
| EFL | 5.045 | 4.918 | 4.928 | 5.145 |
| TL | 5.301 | 5.818 | 5.676 | 5.120 |
| BFL | 1.162 | 0.839 | 0.933 | 1.406 |
| ALT | 3.783 | 4.330 | 4.175 | 3.619 |
| AAG | 1.518 | 1.488 | 1.501 | 1.501 |
| TTL | 6.463 | 6.657 | 6.609 | 6.526 |

FIG. 38

| Condition Expression | First embodiment | Second embodiment | Third embodiment | Fourth embodiment |
|---|---|---|---|---|
| V1−(V3+V4) | 15.241 | 15.241 | 15.241 | 15.241 |
| (T2+T3+T4+T5+T7)/T2 | 6.800 | 5.175 | 5.968 | 6.044 |
| (T1+T4+T5)/G23 | 3.324 | 4.000 | 4.000 | 2.977 |
| ALT/T1 | 3.769 | 4.499 | 4.044 | 3.691 |
| AAG/T7 | 3.333 | 2.973 | 2.697 | 3.700 |
| AAG/(G23+T2) | 2.040 | 1.920 | 2.136 | 1.932 |
| TTL/(T1+T6) | 3.040 | 2.757 | 2.741 | 3.125 |
| TTL/(G23+G67) | 6.300 | 6.614 | 6.576 | 6.358 |
| TTL/(T3+T5+T6) | 3.816 | 3.090 | 3.385 | 3.992 |
| TL/G67 | 10.089 | 9.675 | 9.490 | 10.186 |
| TL/(T1+T7) | 3.633 | 3.977 | 3.573 | 3.694 |
| ALT/(G12+G34+G45+G56) | 7.689 | 8.989 | 8.423 | 7.627 |
| (G23+G67)/T3 | 3.438 | 2.598 | 3.176 | 3.500 |
| (T2+T4+T6)/G67 | 3.336 | 3.599 | 3.366 | 3.394 |
| ALT/G67 | 7.200 | 7.200 | 6.981 | 7.200 |
| ALT/(T1+T3+T5) | 2.402 | 2.600 | 2.600 | 2.401 |
| AAG/G67 | 2.889 | 2.475 | 2.509 | 2.986 |
| AAG/(T2+T3) | 2.800 | 1.964 | 2.452 | 2.746 |
| BFL/G67 | 2.212 | 1.395 | 1.560 | 2.797 |
| EFL/T6 | 4.496 | 3.388 | 3.574 | 4.644 |

FIG. 39

| Condition Expression | Fifth embodiment | Sixth embodiment | Seventh embodiment | Eighth embodiment |
|---|---|---|---|---|
| T1 | 0.947 | 0.930 | 1.002 | 1.001 |
| G12 | 0.184 | 0.076 | 0.075 | 0.126 |
| T2 | 0.266 | 0.243 | 0.290 | 0.245 |
| G23 | 0.374 | 0.552 | 0.580 | 0.495 |
| T3 | 0.381 | 0.348 | 0.318 | 0.316 |
| G34 | 0.146 | 0.114 | 0.109 | 0.091 |
| T4 | 0.331 | 0.308 | 0.349 | 0.390 |
| G45 | 0.260 | 0.179 | 0.296 | 0.185 |
| T5 | 0.220 | 0.306 | 0.220 | 0.282 |
| G56 | 0.102 | 0.065 | 0.109 | 0.083 |
| T6 | 1.264 | 1.536 | 1.054 | 1.209 |
| G67 | 0.534 | 0.667 | 0.532 | 0.539 |
| T7 | 0.433 | 0.447 | 0.492 | 0.435 |
| G7F | 0.589 | 0.589 | 0.589 | 0.589 |
| TF | 0.210 | 0.210 | 0.210 | 0.210 |
| GFP | 0.294 | 0.040 | 0.079 | 0.261 |
| V1 | 55.987 | 55.987 | 55.987 | 55.987 |
| V2 | 20.373 | 20.373 | 20.373 | 20.373 |
| V3 | 20.373 | 20.373 | 20.373 | 22.409 |
| V4 | 20.373 | 20.373 | 20.373 | 22.409 |
| V5 | 20.373 | 20.373 | 20.373 | 20.373 |
| V6 | 55.987 | 55.987 | 55.987 | 55.987 |
| V7 | 55.987 | 55.987 | 55.987 | 55.987 |
| EFL | 5.044 | 4.909 | 4.951 | 5.002 |
| TL | 5.442 | 5.770 | 5.426 | 5.399 |
| BFL | 1.093 | 0.839 | 0.878 | 1.060 |
| ALT | 3.841 | 4.118 | 3.724 | 3.879 |
| AAG | 1.601 | 1.652 | 1.702 | 1.519 |
| TTL | 6.535 | 6.609 | 6.303 | 6.458 |

FIG. 40

| Condition | Fifth embodiment | Sixth embodiment | Seventh embodiment | Eighth embodiment |
|---|---|---|---|---|
| V1-(V3+V4) | 15.241 | 15.241 | 15.241 | 11.169 |
| (T2+T3+T4+T5+T7)/T2 | 6.136 | 6.800 | 5.753 | 6.800 |
| (T1+T4+T5)/G23 | 4.000 | 2.797 | 2.706 | 3.379 |
| ALT/T1 | 4.058 | 4.429 | 3.718 | 3.874 |
| AAG/T7 | 3.700 | 3.700 | 3.460 | 3.494 |
| AAG/(G23+T2) | 2.500 | 2.078 | 1.955 | 2.051 |
| TTL/(T1+T6) | 2.956 | 2.680 | 3.066 | 2.921 |
| TTL/(G23+G67) | 7.197 | 5.423 | 5.668 | 6.245 |
| TTL/(T3+T5+T6) | 3.504 | 3.017 | 3.959 | 3.573 |
| TL/G67 | 10.200 | 8.655 | 10.200 | 10.019 |
| TL/(T1+T7) | 3.945 | 4.193 | 3.633 | 3.759 |
| ALT/(G12+G34+G45+G56) | 5.547 | 9.499 | 6.318 | 7.995 |
| (G23+G67)/T3 | 2.383 | 3.500 | 3.500 | 3.270 |
| (T2+T4+T6)/G67 | 3.488 | 3.131 | 3.183 | 3.424 |
| ALT/G67 | 7.200 | 6.177 | 7.001 | 7.200 |
| ALT/(T1+T3+T5) | 2.482 | 2.600 | 2.419 | 2.426 |
| AAG/G67 | 3.000 | 2.478 | 3.199 | 2.820 |
| AAG/(T2+T3) | 2.475 | 2.795 | 2.800 | 2.705 |
| BFL/G67 | 2.049 | 1.258 | 1.650 | 1.966 |
| EFL/T6 | 3.990 | 3.196 | 4.696 | 4.136 |

FIG. 41

OPTICAL IMAGING LENS

CROSS-REFERENCE TO RELATED APPLICATION

This application is a continuation application of and claims the priority benefit of U.S. application Ser. No. 17/224,125, filed on Apr. 7, 2021, now pending, which is a continuation application of and claims the priority benefit of U.S. application Ser. No. 16/429,067, filed on Jun. 3, 2019, now patented. The prior U.S. application Ser. No. 16/429,067 is a continuation application of and claims the priority benefit of U.S. application Ser. No. 15/915,068, filed on Mar. 8, 2018, now patented, which claims the priority benefit of Chinese application serial no. 201711477924.0, filed on Dec. 29, 2017. The entirety of each of the above-mentioned patent applications is hereby incorporated by reference herein and made a part of this specification.

BACKGROUND OF THE INVENTION

Field of the Invention

The invention is related to an optical element, and particularly to an optical imaging lens.

Description of Related Art

Dimension of consumer electronics is ever-changing, and demands for compact and slim products have been increased; therefore, it is inevitable that the specification of essential component of electronic products such as optical lens must be improved continuously in order to meet consumers' need. The most important characteristic of optical lens lies in imaging quality and size. In addition, it is increasingly important to enhance field of view as well as expand characteristic of aperture. When it comes to imaging quality, along with advancement of imaging sensing technology, consumers' requirement for imaging quality is higher. Accordingly, in the field of optical lens design, apart from pursing slimness of lens, the imaging quality and performance of lens need to be taken into consideration as well.

However, the design of an optical lens with good imaging quality and miniaturized size cannot be achieved by simply reducing the proportion of lens with good imaging quality. The design process not only involves property of materials but also actual manufacturing issues such as production and yield rate. In particular, the technical difficulty of miniaturized lens is significantly higher than that of conventional lens. Therefore, it has been an objective for practitioners in the field to find out how to fabricate an optical lens that meets the requirement of consumer electronics while keeping improving the imaging quality thereof.

SUMMARY OF THE INVENTION

The invention provides an optical imaging lens which has good optical property and larger half field of view.

An embodiment of the invention provides an optical imaging lens including a first lens element, a second lens element, a third lens element, a fourth lens element, a fifth lens element, a sixth lens element, and a seventh lens element arranged in a sequence from an object side to an image side along an optical axis. Each of the lens elements includes an object-side surface facing the object side and allowing an imaging ray to pass through and an image-side surface facing the image side and allowing the imaging ray to pass through. The lens element of the optical imaging lens having refracting power only includes the above-mentioned seven lens elements. A periphery region of an image-side surface of the second lens element is concave. A periphery region of an object-side surface of the third lens element is concave. A periphery region of an object-side surface of the sixth lens element is concave. An optical axis region of an image-side surface of the sixth lens element is a convex. The optical imaging lens meets the following condition expression: $V1-(V3+V4) \geq -10.000$. $V1$ is an Abbe number of the first lens element. $V3$ is an Abbe number of the third element. $V4$ is an Abbe number of the fourth lens element.

In summary of the above, the advantageous effect of the optical imaging lens in the embodiment of the invention lies in: by controlling the design and arrangement of concave-convex curved surfaces of the above-mentioned lens element while satisfying the condition expression $V1-(V3+V4) \geq -10.000$, the optical imaging lens in the embodiment of the invention can achieve good optical property and expand field of view.

In order to make the aforementioned features and advantages of the disclosure more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a schematic view illustrating an optical imaging lens according to a first embodiment of the invention.

FIG. 7A to FIG. 7D are diagrams illustrating longitudinal spherical aberration and other aberrations of the optical imaging lens according to the first embodiment of the invention.

FIG. 8 shows detailed optical data pertaining to the optical imaging lens according to the first embodiment of the invention.

FIG. 9 shows aspheric parameters pertaining to the optical imaging lens according to the first embodiment of the invention.

FIG. 12 shows detailed optical data pertaining to the optical imaging lens according to the second embodiment of the invention.

FIG. 13 shows aspheric parameters pertaining to the optical imaging lens according to the second embodiment of the invention.

FIG. 14 is a schematic view illustrating an optical imaging lens according to a third embodiment of the invention.

FIG. 15A to FIG. 15D are diagrams illustrating longitudinal spherical aberration and other aberrations of the optical imaging lens according to the third embodiment of the invention.

FIG. 16 shows detailed optical data pertaining to the optical imaging lens according to the third embodiment of the invention.

FIG. 17 shows aspheric parameters pertaining to the optical imaging lens according to the third embodiment of the invention.

FIG. 18 is a schematic view illustrating an optical imaging lens according to a fourth embodiment of the invention.

FIG. 19A to FIG. 19D are diagrams illustrating longitudinal spherical aberration and other aberrations of the optical imaging lens according to the fourth embodiment of the invention.

FIG. 20 shows detailed optical data pertaining to the optical imaging lens according to the fourth embodiment of the invention.

FIG. 21 shows aspheric parameters pertaining to the optical imaging lens according to the fourth embodiment of the invention.

FIG. 22 is a schematic view illustrating an optical imaging lens according to a fifth embodiment of the invention.

FIG. 23A to FIG. 23D are diagrams illustrating longitudinal spherical aberration and other aberrations of the optical imaging lens according to the fifth embodiment of the invention.

FIG. 24 shows detailed optical data pertaining to the optical imaging lens according to the fifth embodiment of the invention.

FIG. 25 shows aspheric parameters pertaining to the optical imaging lens according to the fifth embodiment of the invention.

FIG. 28 shows detailed optical data pertaining to the optical imaging lens according to the sixth embodiment of the invention.

FIG. 29 shows aspheric parameters pertaining to the optical imaging lens according to the sixth embodiment of the invention.

FIG. 32 shows detailed optical data pertaining to the optical imaging lens according to the seventh embodiment of the invention.

FIG. 33 shows aspheric parameters pertaining to the optical imaging lens according to the seventh embodiment of the invention.

FIG. 36 shows detailed optical data pertaining to the optical imaging lens according to the eighth embodiment of the invention.

FIG. 37 shows aspheric parameters pertaining to the optical imaging lens according to the eighth embodiment of the invention.

FIG. 38 and FIG. 39 show important parameters and relation values thereof pertaining to the optical imaging lenses according to the first through the fourth embodiments of the invention.

FIG. 40 and FIG. 41 show important parameters and relation values thereof pertaining to the optical imaging lenses according to the fifth through the eighth embodiments of the invention.

DESCRIPTION OF THE EMBODIMENTS

Figure 1:
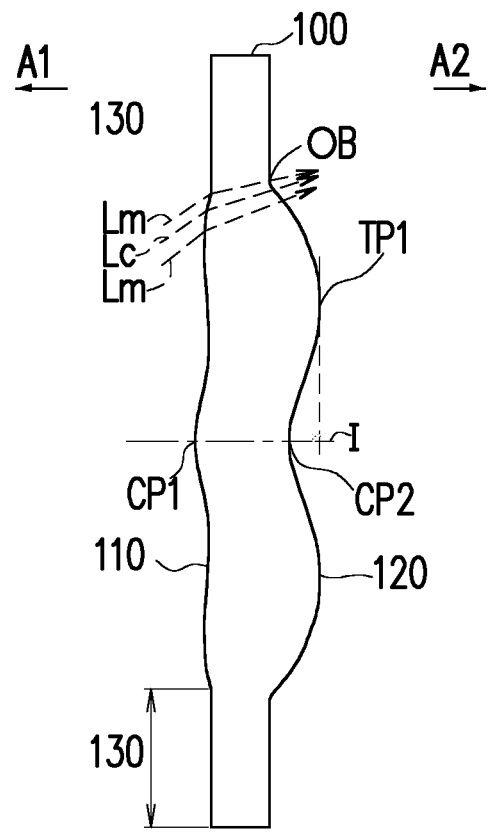
FIG. 1 is a schematic view illustrating a surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
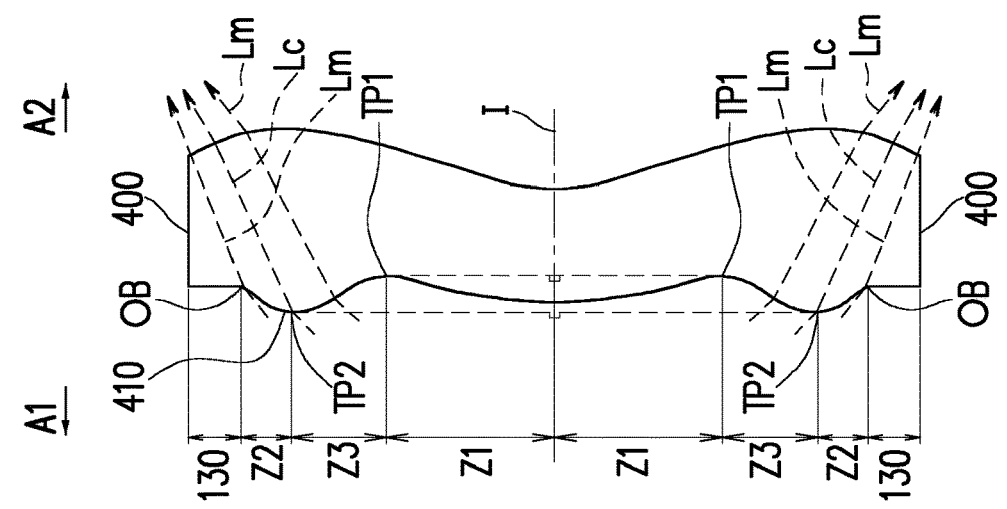
FIG. 4 is a schematic view illustrating a surface structure of a lens element according to a second example.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
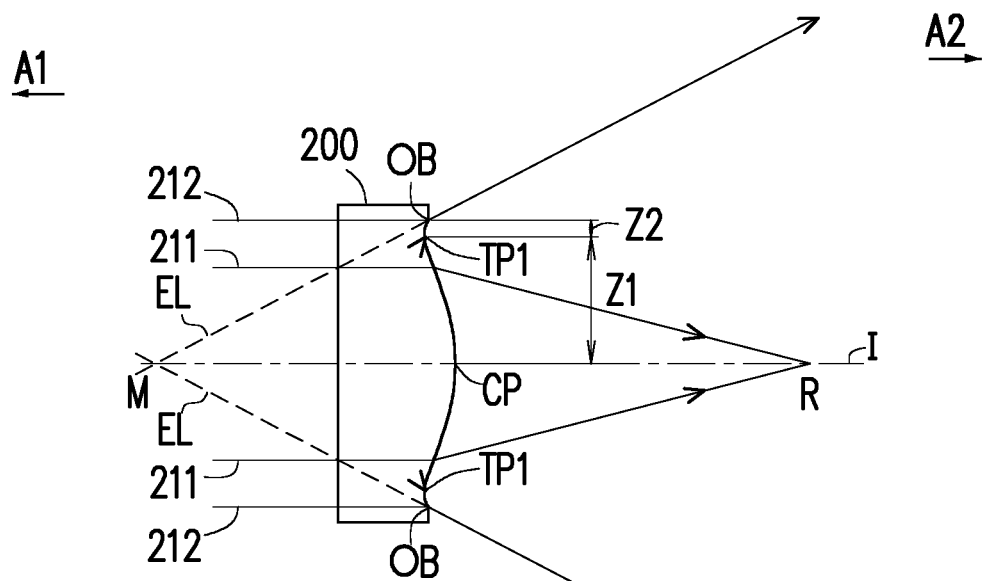
FIG. 2 is a schematic view illustrating a concave and convex surface structure of a lens element and a ray focal point.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
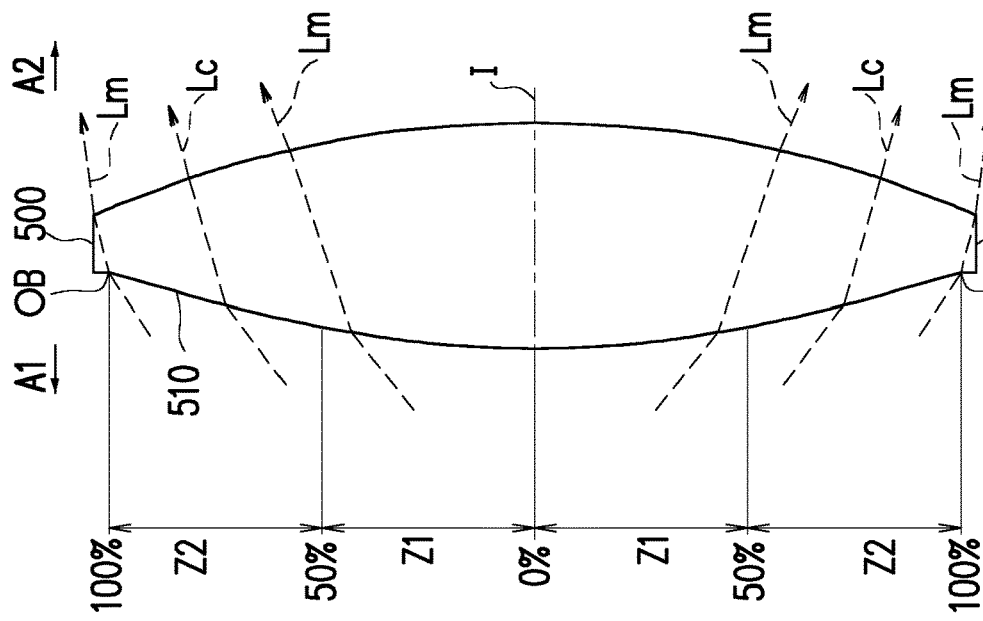
FIG. 5 is a schematic view illustrating a surface structure of a lens element according to a third example.
Figure 3:
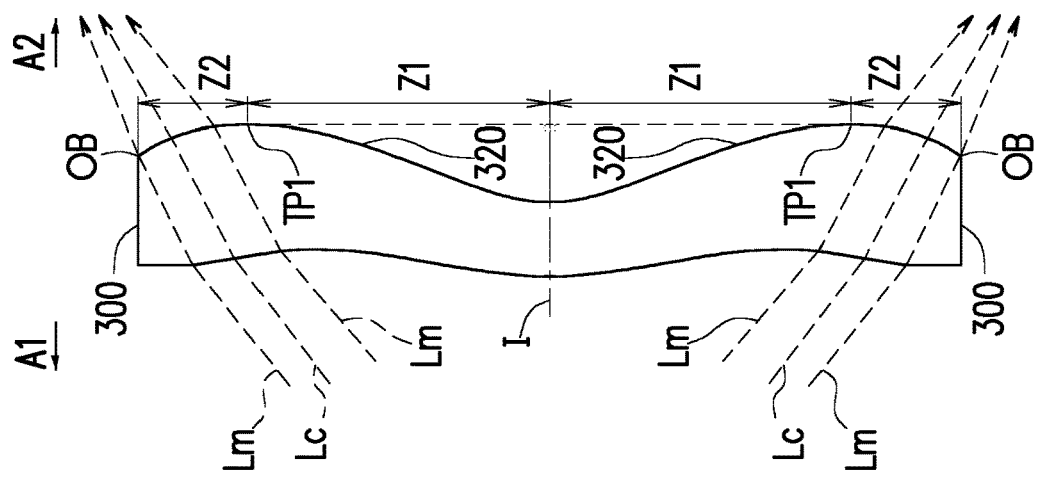
FIG. 3 is a schematic view illustrating a surface structure of a lens element according to a first example.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region be 50%-100% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic view illustrating an optical imaging lens according to a first embodiment of the invention. FIG. 7A to FIG. 7D are diagrams illustrating longitudinal spherical aberration and other aberrations of the optical imaging lens according to the first embodiment of the invention. Referring to FIG. 6, according to a first embodiment of the invention, an optical imaging lens 10 includes an aperture 0, a first lens element 1, a second lens element 2, a third lens element 3, a fourth lens element 4, a fifth lens element 5, a sixth lens element 6, a seventh lens element 7 and a filter 9 (e.g. IR cut filter) arranged in a sequence from an object side A1 to an image side A2 along an optical axis I of the optical imaging lens 10. When a light emitted from an object to be captured enters the optical imaging lens 10 and passes through the aperture 0, the first lens element 1, the second lens element 2, the third lens element 3, the fourth lens element 4, the fifth lens element 5, the sixth lens element 6, the seventh lens element 7 and the filter 9 in sequence, an image is formed on an image plane 99. The filter 9 is disposed between the seventh lens element 7 and the image plane 99. It should be noted that the object side A1 is a side facing the object to be captured, and the image side A2 is a side facing the image plane 99.

In the embodiment, each of the first lens element 1, the second lens element 2, the third lens element 3, the fourth lens element 4, the fifth lens element 5, the sixth lens element 6, the seventh lens element 7 and the filter 9 of the optical imaging lens 10 respectively has an object-side surface 15, 25, 35, 45, 55, 65, 75 and 95 facing the object side A1 and allowing an imaging ray to pass through as well as an image-side surface 16, 26, 36, 46, 56, 66, 76 and 96 facing the image side A2 and allowing the imaging ray to pass through. In the embodiment, the aperture 0 is disposed in front of the first lens element 3.

The first lens element 1 has positive refracting power. The material of the first lens element 1 is plastic. An optical axis region 151 of the object-side surface 15 of the first lens element 1 is convex, and a periphery region 153 of the object-side surface 15 of the first lens element 1 is convex. An optical axis region 162 of the image-side surface 16 of the first lens element 1 is concave, and a periphery region 163 of the image-side surface 16 of the first lens element 1 is convex. In the embodiment, the object-side surface 15 and the image-side surface 16 of the first lens element 1 are aspheric surfaces.

The second lens element 2 has negative refracting power. The material of the second lens element 2 is plastic. An optical axis region 251 of the object-side surface 25 of the second lens element 2 is convex, and a periphery region 253 of the object-side surface 25 of the second lens element 2 is convex. An optical axis region 262 of the image-side surface 26 of the second lens element 2 is concave, and a periphery region 264 of the image-side surface 26 of the second lens element 2 is concave. In the embodiment, the object-side surface 25 and the image-side surface 26 of the second lens element 2 are aspheric surfaces.

The third lens element 3 has negative refracting power. The material of the third lens element 3 is plastic. An optical axis region 351 of the object-side surface 35 of the third lens element 3 is a convex, and a periphery region 354 of the object-side surface 35 of the third lens element 3 is concave. An optical axis region 362 of the image-side surface 36 of the third lens element 3 is concave, and a periphery region 363 of the image-side surface 36 of the third lens element 3 is convex. In the embodiment, the object-side surface 35 and the image-side surface 36 of the third lens element 3 are aspheric surfaces.

The fourth lens element 4 has positive refracting power. The material of the fourth lens element 4 is plastic. An optical axis region 451 of the object-side surface 45 of the fourth lens element 4 is convex, and a periphery region 454 of the object-side surface 45 of the fourth lens element 4 is concave. An optical axis region 462 of the image-side surface 46 of the fourth lens element 4 is concave, and a periphery region 463 of the image-side surface 46 of the fourth lens element 4 is convex. In the embodiment, the object-side surface 45 and the image-side surface 46 of the fourth lens element 4 are aspheric surfaces.

The fifth lens element 5 has negative refracting power. The material of the fifth lens element 5 is plastic. An optical axis region 551 of the object-side surface 55 of the fifth lens element 5 is a convex, and a periphery region 554 of the object-side surface 55 of the fifth lens element 5 is concave. An optical axis region 562 of the image-side surface 56 of the fifth lens element 5 is concave, and a periphery region 563 of the image-side surface 56 of the fifth lens element 5 is convex. In the embodiment, the object-side surface 55 and the image-side surface 56 of the fifth lens element 5 are aspheric surfaces.

The sixth lens element 6 has positive refracting power. The material of the sixth lens element 6 is plastic. An optical axis region 651 of the object-side surface 65 of the sixth lens element 6 is convex, and a periphery region 654 of the object-side surface 65 of the sixth lens element 6 is concave. An optical axis region 661 of the image-side surface 66 of the sixth lens element 6 is convex, and a periphery region 663 of the image-side surface 66 of the sixth lens element 6 is convex. In the embodiment, the object-side surface 65 and the image-side surface 66 of the sixth lens element 6 are aspheric surfaces.

The seventh lens element 7 has negative refracting power. The material of the seventh lens element 7 is plastic. An optical axis region 752 of the object-side surface 75 of the seventh lens element 7 is a concave, and a periphery region 754 of the object-side surface 75 of the seventh lens element 7 is concave. An optical axis region 762 of the image-side surface 76 of the seventh lens element 7 is concave, and a periphery region 763 of the image-side surface 76 of the seventh lens element 7 is convex. In the embodiment, the object-side surface 75 and the image-side surface 76 of the seventh lens element 7 are aspheric surfaces.

In the embodiment, the lens elements having refracting power of the optical imaging lens 10 only includes the above-mentioned seven lens elements.

Other detailed optical data of the first embodiment is as shown in FIG. 8. In the first embodiment, a system length of the optical imaging lens 10 is 6.463 mm, the total effective focal length (EFL) is 5.045 mm, the half field of view is 34.340°, the image height is 3.500 mm, the F-number (Fno) is 1.580, wherein the system length refers to a distance from the object-side surface 15 of the first lens element 1 to the image plane 99 along the optical axis I.

Additionally, in the embodiment, a total of fourteen surfaces, namely object-side surfaces 15, 25, 35, 45, 55, 65 and 75 as well as the image-side surfaces 16, 26, 36, 46, 56, 66 and 76 of the first lens element 1, the second lens element 2, the third lens element 3, the fourth lens element 4, the fifth lens element 5, the sixth lens element 6 and the seventh lens element 7 are general even asphere surfaces. The aspheric surfaces are defined by on the following equation:

$$Z(Y) = \frac{Y^2}{R}/(1+\sqrt{1-(1+K)\frac{Y^2}{R^2}})+\sum_{i=1}^{n}a_{2i}\times Y^{2i} \quad (1)$$

Y: a distance from a point on an aspheric curve to the optical axis;

Z: a depth of the aspheric surface (i.e. a perpendicular distance between the point on the aspheric surface that is spaced by the distance Y from the optical axis and a tangent plane tangent to a vertex of the aspheric surface on the optical axis);

R: radius of curvature of the surface of the lens element;

K: conic constant $a_{2i}$:$2i^{th}$ aspheric coefficient

Each aspheric coefficient from the object-side surface 15 of the first lens element 1 to the image-side surface 76 of the seventh lens element 7 in the equation (1) is indicated in FIG. 9. In FIG. 9, the referential number 15 is one column that represents the aspheric coefficient of the object-side surface 15 of the first lens element 1, and the reference numbers in other columns can be deduced from the above.

Additionally, the relationship among the important parameters pertaining to the optical imaging lens 10 of the first embodiment is indicated in FIG. 38 and FIG. 39. Specifically, in FIG. 38, the unit of value from row T1 to row GFP and from row EFL to TTL is millimeter (mm).

wherein,

V1 is an Abbe number of the first lens element 1;
V2 is an Abbe number of the second lens element 2;
V3 is an Abbe number of the third lens element 3;
V4 is an Abbe number of the fourth lens element 4;
V5 is an Abbe number of the fifth lens element 5;
V6 is an Abbe number of the sixth lens element 6;
V7 is an Abbe number of the seventh lens element 7;
T1 represents the center thickness of the first lens element 1 along the optical axis I;
T2 represents the center thickness of the second lens element 2 along the optical axis I;
T3 represents the center thickness of the third lens element 3 along the optical axis I;
T4 represents the center thickness of the fourth lens element 4 along the optical axis I;
T5 represents the center thickness of the fifth lens element 5 along the optical axis I;
T6 represents the center thickness of the sixth lens element 6 along the optical axis I;
T7 represents the center thickness of the seventh lens element 7 along the optical axis I;
G12 represents an air gap between the first lens element 1 and the second lens element 2 along the optical axis I;
G23 represents an air gap between the second lens element 2 and the third lens element 3 along the optical axis I;
G34 represents an air gap between the third lens element 3 and the fourth lens element 4 along the optical axis I;
G45 represents an air gap between the fourth lens element 4 and the fifth lens element 5 along the optical axis I;
G56 represents an air gap between the fifth lens element 5 and the sixth lens element 6 along the optical axis I;
G67 represents an air gap between the sixth lens element 6 and the seventh lens element 7 along the optical axis I;
G7F represents an air gap between the seventh lens element 7 and the filter 9 along the optical axis I;
TF represents a center thickness of the filter 9 along the optical axis I;
GFP represents an air gap between the filter 9 and the image plane 99 along the optical axis I;
AAG represents a sum of six air gaps among the first lens element 1 through the seventh lens element 7 along the optical axis I, i.e., the sum of gaps G12, G23, G34, G45, G56 and G67;
ALT represents a sum of center thicknesses of seven lens elements including the first lens element 1 through the seventh lens element 7 along the optical axis I, i.e., the sum of center thicknesses T1, T2, T3, T4, T5, T6 and T7;
EFL represents an effective focal length of the optical lens assembly 10;
BFL represents a distance from the image-side surface 76 of the seventh lens element 7 to the image plane 99 of the optical imaging lens 10 along the optical axis I;
TTL represents a distance from the object-side surface 15 of the first lens element 1 to the image plane 99 of the optical imaging lens 10 along the optical axis I;
TL represents a distance from the object-side surface 15 of the first lens element 1 to the image-side surface 76 of the seventh lens element 7 along the optical axis I;
HFOV represents the half field of view of the optical imaging lens 10.

With reference to FIG. 7A to FIG. 7D, FIG. 7A is a diagram describing the longitudinal spherical aberration in the first embodiment in the condition that the pupil radius is 1.5967 mm; FIG. 7B and FIG. 7C are diagrams respectively describing the field curvature aberration in the sagittal direction and the field curvature aberration in the tangential direction on the image plane 99 of the first embodiment in the condition that the wavelength is 470 nm, 555 nm and 650 nm. FIG. 7D is a diagram describing distortion aberration of the image plane 99 of the first embodiment in the condition that the wavelength is 470 nm, 555 nm and 650 nm. In FIG. 7A showing the longitudinal spherical aberration of the first embodiment, the curve of each wavelength is close to one another and near the middle position, which shows that the off-axis ray of each wavelength at different heights are focused near the imaging point. The skew margin of the curve of each wavelength shows that the imaging point deviation of the off-axis ray at different heights is controlled within a range of ±0.025 mm. Therefore, it is evident that the first embodiment can significantly improve spherical aberration of the same wavelength. Additionally, the distances between the three representative wavelengths are close to one another, which represents that the imaging positions of the rays with different wavelengths are concentrated, therefore, the chromatic aberration can be significantly improved.

In FIGS. 7B and 7C which illustrate two diagrams of field curvature aberration, the focal length variation of the three representative wavelengths in the entire field of view falls within a range of ±0.025 mm, which represents that the optical system in the first embodiment can effectively eliminate aberration. In FIG. 7D, the diagram of distortion aberration shows that the distortion aberration in the first embodiment can be maintained within a range of ±2.5%, which shows that the distortion aberration in the first embodiment can meet the imaging quality requirement of the optical system. Based on the above, it is shown that the first embodiment can provide good image quality compared with existing optical imaging lens under the condition where the system length of the optical imaging lens is shortened to about 6.463 mm.

Figure 10:
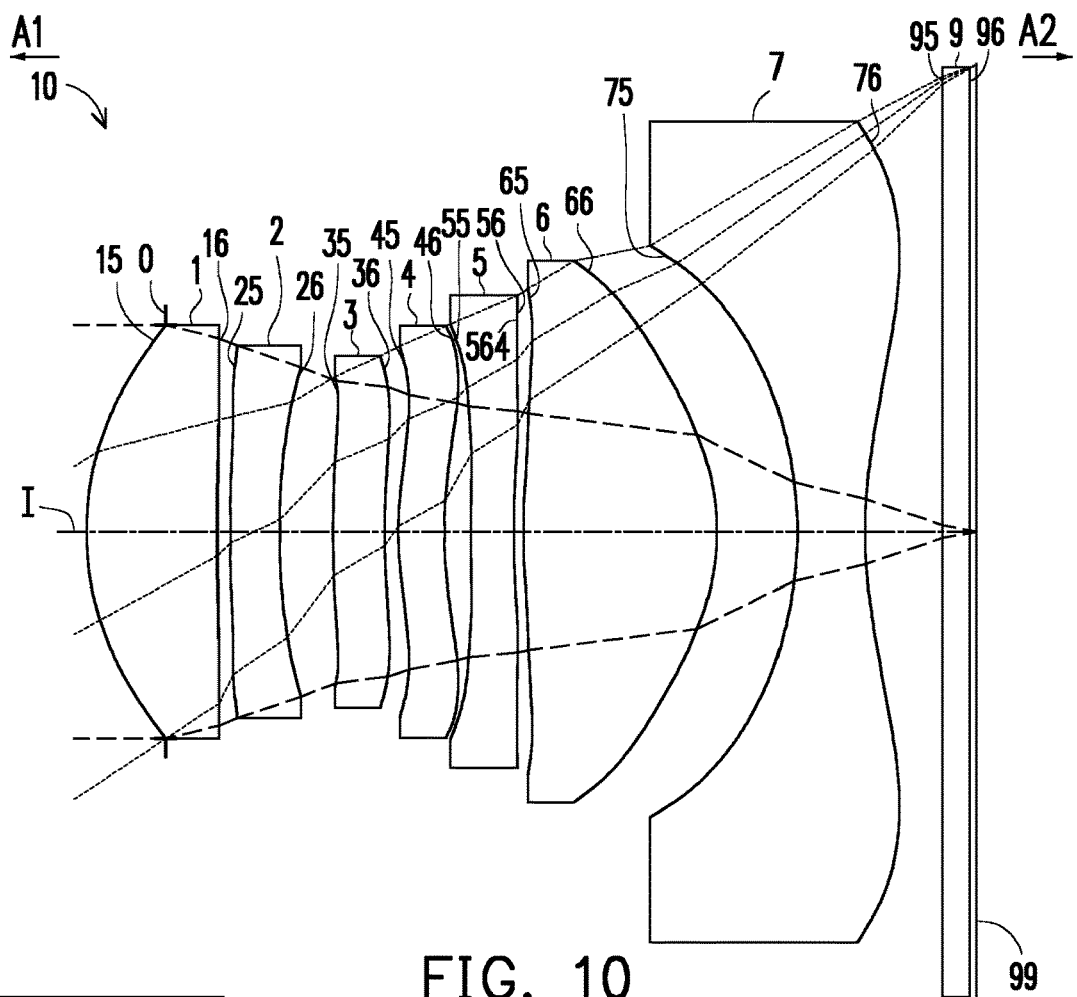
FIG. 10 is a schematic view illustrating an optical imaging lens according to a second embodiment of the invention.

FIG. 10 is a schematic view illustrating an optical imaging lens according to a second embodiment of the invention, FIGS. 11A to 11D are diagrams illustrating longitudinal spherical aberration and other aberrations of the optical imaging lens according to the second embodiment of the invention. Referring to FIG. 10, the second embodiment of the optical imaging lens 10 of the invention is similar to the first embodiment, and the difference lies in optical data, aspheric coefficients and the parameters of the lens elements 1, 2, 3, 4, 5, 6 and 7, and a periphery region 564 of the image-side surface 56 of the fifth lens element 5 is concave. It should be noted that, in order to show the view clearly, some numerals which are the same as those used for the optical axis region and the periphery region in the first embodiment are omitted in FIG. 10.

Detailed optical data pertaining to the optical imaging lens 10 is as shown in FIG. 12. In the second embodiment, the system length of the optical imaging lens 10 is 6.657 mm, the total effective focal length is 4.918 mm, the half field of view (HFOV) is 33.570°, the image height is 3.500 mm and the f-number (Fno) is 1.582.

FIG. 13 shows each aspheric coefficient pertaining to the object-side surface 15 of the first lens element 1 through the image-side surface 76 of the seventh lens element 7 in the equation (1) in the second embodiment.

Additionally, the relationship among the important parameters pertaining to the optical imaging lens 10 of the second embodiment is indicated in FIG. 38 and FIG. 39.

Figures 11A, 11B, 11C, 11D:
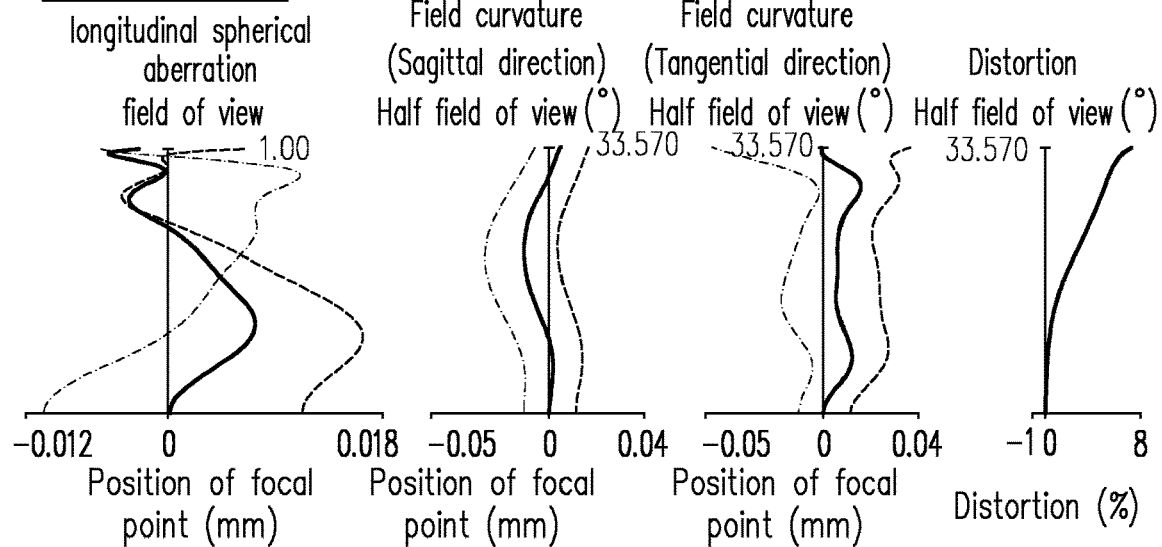
FIG. 11A to FIG. 11D are diagrams illustrating longitudinal spherical aberration and other aberrations of the optical imaging lens according to the second embodiment of the invention.

In FIG. 11A which illustrates longitudinal spherical aberration of the second embodiment in the condition that the pupil radius is 1.5565 mm, the imaging point deviation of the off-axis ray at different heights is controlled within a range of ±0.017 mm. In FIGS. 11B and 11C which illustrate two diagrams of field curvature aberration, the focal length variation of the three representative wavelengths in the entire field of view falls within a range of ±0.05 mm. In FIG. 11D, the diagram of distortion aberration shows that the distortion aberration in the second embodiment can be maintained within a range of ±8.0%. In view of the above, the second embodiment is easier to be manufactured and has higher yield rate as compared to the first embodiment.

Based on the above, it can be derived that the longitudinal aberration of the second embodiment is smaller than the longitudinal aberration of the first embodiment.

FIG. 14 is a schematic view illustrating an optical imaging lens according to a third embodiment of the invention, FIGS. 15A to 15D are diagrams illustrating longitudinal spherical aberration and other aberrations of the optical imaging lens according to the third embodiment of the invention. Referring to FIG. 14, the third embodiment of the optical imaging lens 10 of the invention is similar to the first embodiment, and the difference lies in optical data, aspheric coefficients and the parameters of the lens elements 1, 2, 3, 4, 5, 6 and 7. It should be noted that, in order to show the view clearly, some numerals which are the same as those used for the optical axis region and the periphery region in the first embodiment are omitted in FIG. 14.

Detailed optical data pertaining to the optical imaging lens 10 is as shown in FIG. 16. In the third embodiment, the system length of the optical imaging lens 10 is 6.609 mm, the total effective focal length is 4.928 mm, the half field of view (HFOV) is 34.561°, the image height is 3.500 mm and the f-number (Fno) is 1.583.

FIG. 17 shows each aspheric coefficient pertaining to the object-side surface 15 of the first lens element 1 through the image-side surface 76 of the seventh lens element 7 in the equation (1) in the third embodiment.

Additionally, the relationship among the important parameters pertaining to the optical imaging lens 10 of the third embodiment is indicated in FIG. 38 and FIG. 39.

In FIG. 15A which illustrates longitudinal spherical aberration of the third embodiment in the condition that the pupil radius is 1.5597 mm, the imaging point deviation of the off-axis ray at different heights is controlled within a range of ±0.02 mm. In FIGS. 15B and 15C which illustrate two diagrams of field curvature aberration, the focal length variation of the three representative wavelengths in the entire field of view falls within a range of ±0.045 mm. In FIG. 15D, the diagram of distortion aberration shows that the distortion aberration in the third embodiment can be maintained within a range of ±3.2%. In view of the above, the third embodiment is easier to be manufactured and has higher yield rate as compared to the first embodiment.

In view of the above, it can be derived that the half field of view of the third embodiment is larger than the half field of view of the first embodiment, and the longitudinal spherical aberration of the third embodiment is smaller than the longitudinal spherical aberration of the first embodiment.

FIG. 18 is a schematic view illustrating an optical imaging lens according to a fourth embodiment of the invention, FIGS. 19A to 19D are diagrams illustrating longitudinal spherical aberration and other aberrations of the optical imaging lens according to the fourth embodiment of the invention. Referring to FIG. 18, the fourth embodiment of the optical imaging lens 10 of the invention is similar to the first embodiment, and the difference lies in optical data, aspheric coefficients and the parameters of the lens elements 1, 2, 3, 4, 5, 6 and 7. It should be noted that, in order to show the view clearly, some numerals which are the same as those used for the optical axis region and the periphery region in the first embodiment are omitted in FIG. 18.

Detailed optical data pertaining to the optical imaging lens 10 is as shown in FIG. 20. In the fourth embodiment, the system length of the optical imaging lens 10 is 6.526 mm, the total effective focal length is 5.145 mm, the half field of view (HFOV) is 34.006°, the image height is 3.500 mm and the f-number (Fno) is 1.581.

FIG. 21 shows each aspheric coefficient pertaining to the object-side surface 15 of the first lens element 1 through the image-side surface 76 of the seventh lens element 7 in the equation (1) in the fourth embodiment.

Additionally, the relationship among the important parameters pertaining to the optical imaging lens 10 of the fourth embodiment is indicated in FIG. 38 and FIG. 39.

In FIG. 19A which illustrates longitudinal spherical aberration of the fourth embodiment in the condition that the pupil radius is 1.6284 mm, the imaging point deviation of the off-axis ray at different heights is controlled within a range of ±0.035 mm. In FIGS. 19B and 19C which illustrate two diagrams of field curvature aberration, the focal length variation of the three representative wavelengths in the entire field of view falls within a range of ±0.045 mm. In FIG. 19D, the diagram of distortion aberration shows that the distortion aberration in the fourth embodiment can be maintained within a range of ±2.0%. In view of the above, the fourth embodiment is easier to be manufactured and has higher yield rate as compared to the first embodiment.

Based on the above, it can be derived that the distortion aberration of the fourth embodiment is smaller than the distortion aberration of the first embodiment.

FIG. 22 is a schematic view illustrating an optical imaging lens according to a fifth embodiment of the invention, FIGS. 23A to 23D are diagrams illustrating longitudinal spherical aberration and other aberrations of the optical imaging lens according to the fifth embodiment of the invention. Referring to FIG. 22, the fifth embodiment of the optical imaging lens 10 of the invention is similar to the first embodiment, and the difference lies in optical data, aspheric coefficients and the parameters of the lens elements 1, 2, 3, 4, 5, 6 and 7, and the third lens element 3 has positive refracting power. It should be noted that, in order to show the view clearly, some numerals which are the same as those used for the optical axis region and the periphery region in the first embodiment are omitted in FIG. 22.

Detailed optical data pertaining to the optical imaging lens 10 is as shown in FIG. 24. In the fifth embodiment, the system length of the optical imaging lens 10 is 6.535 mm, the total effective focal length is 5.044 mm, the half field of view (HFOV) is 34.375°, the image height is 3.500 and the f-number (Fno) is 1.581.

FIG. 25 shows each aspheric coefficient pertaining to the object-side surface 15 of the first lens element 1 through the image-side surface 76 of the seventh lens element 7 in the equation (1) in the fifth embodiment.

Additionally, the relationship among the important parameters pertaining to the optical imaging lens 10 of the fifth embodiment is indicated in FIG. 40 and FIG. 41. Specifically, in FIG. 40, the unit of value from row T1 to row GFT and from row EFL to row TTL is millimeter (mm).

In FIG. 23A which illustrates longitudinal spherical aberration of the fifth embodiment in the condition that the pupil radius is 1.5963 mm, the imaging point deviation of the off-axis ray at different heights is controlled within a range of ±0.028 mm. In FIGS. 23B and 23C which illustrate two diagrams of field curvature aberration, the focal length variation of the three representative wavelengths in the entire field of view falls within a range of ±0.03 mm. In FIG. 23D, the diagram of distortion aberration shows that the distortion aberration in the fifth embodiment can be maintained within a range of ±2.0%. In view of the above, the fifth embodiment is easier to be manufactured and has higher yield rate as compared to the first embodiment.

Based on the above, it can be derived that the half field of view of the fifth embodiment is larger than the half field of view of the first embodiment, and the distortion aberration of the fifth embodiment is smaller than the distortion aberration of the first embodiment.

Figure 26:
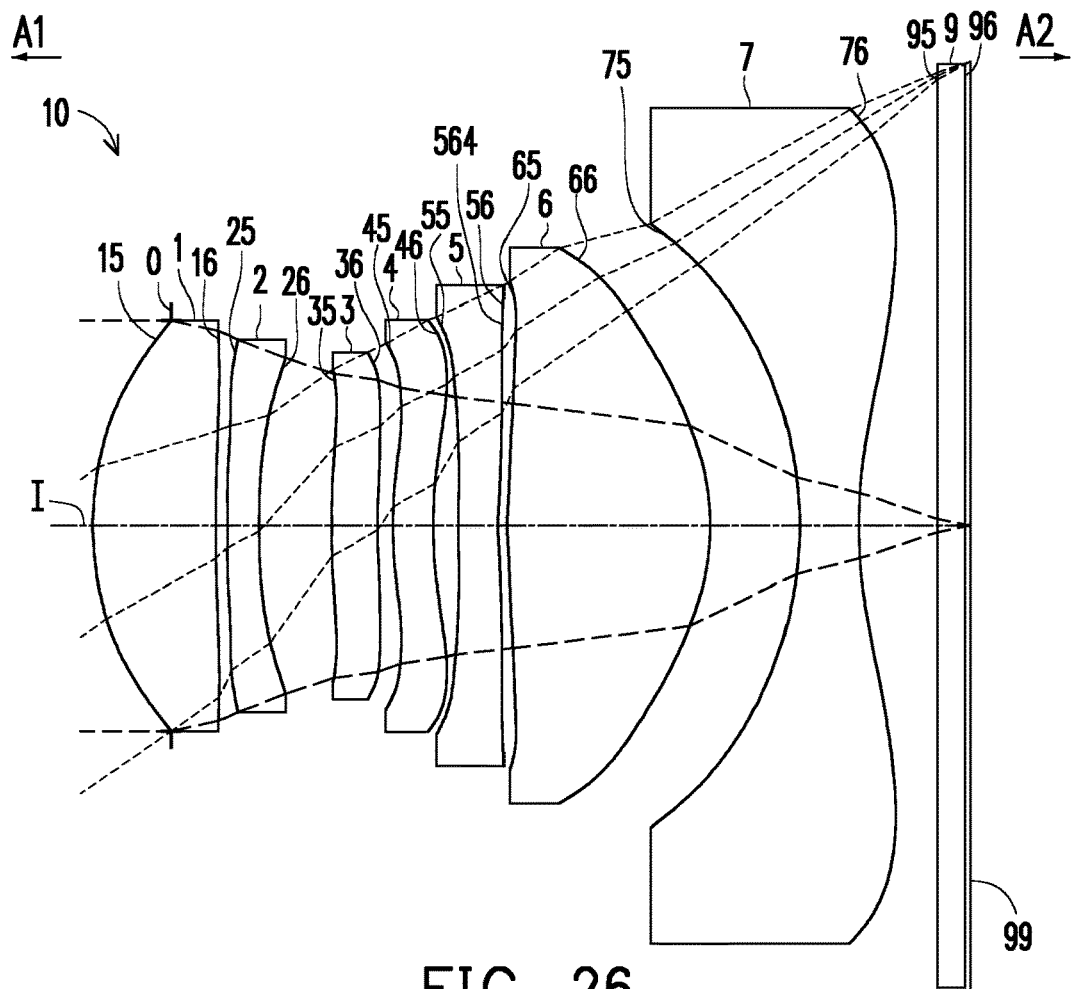
FIG. 26 is a schematic view illustrating an optical imaging lens according to a sixth embodiment of the invention.

FIG. 26 is a schematic view illustrating an optical imaging lens according to a sixth embodiment of the invention, FIGS. 27A to 27D are diagrams illustrating longitudinal spherical aberration and other aberrations of the optical imaging lens according to the sixth embodiment of the invention. Referring to FIG. 26, the sixth embodiment of the optical imaging lens 10 of the invention is similar to the first embodiment, and the difference lies in optical data, aspheric coefficients and the parameters of the lens elements 1, 2, 3, 4, 5, 6 and 7, and a periphery region 564 of the image-side surface 56 of the fifth lens element 5 is concave. It should be noted that, in order to show the view clearly, some numerals which are the same as those used for the optical axis region and the periphery region in the first embodiment are omitted in FIG. 26.

Detailed optical data pertaining to the optical imaging lens 10 is as shown in FIG. 28. In the sixth embodiment, the system length of the optical imaging lens 10 is 6.609 mm, the total effective focal length is 4.909 mm, the half field of view (HFOV) is 35.096°, the image height is 3.500 mm and the f-number (Fno) is 1.584.

FIG. 29 shows each aspheric coefficient pertaining to the object-side surface 15 of the first lens element 1 through the image-side surface 76 of the seventh lens element 7 in the equation (1) in the sixth embodiment.

Additionally, the relationship among the important parameters pertaining to the optical imaging lens 10 of the sixth embodiment is indicated in FIG. 40 and FIG. 41.

Figures 27A, 27B, 27C, 27D:
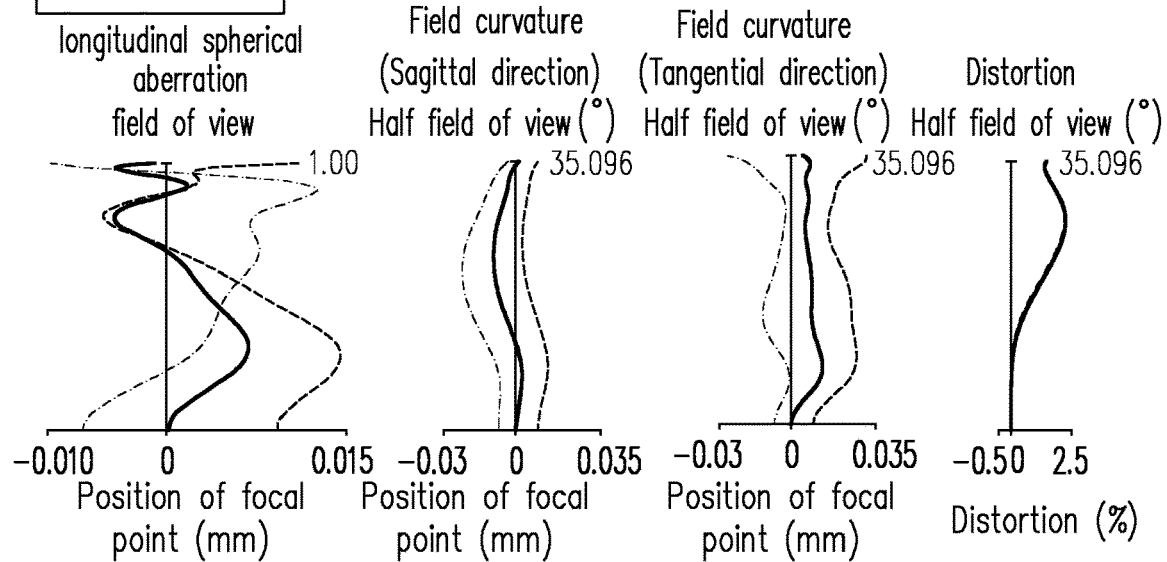
FIG. 27A to FIG. 27D are diagrams illustrating longitudinal spherical aberration and other aberrations of the optical imaging lens according to the sixth embodiment of the invention.

In FIG. 27A which illustrates longitudinal spherical aberration of the sixth embodiment in the condition that the pupil radius is 1.5536 mm, the imaging point deviation of the off-axis ray at different heights is controlled within a range of ±0.015 mm. In FIGS. 27B and 27C which illustrate two diagrams of field curvature aberration, the focal length variation of the three representative wavelengths in the entire field of view falls within a range of ±0.035 mm. In FIG. 27D, the diagram of distortion aberration shows that the distortion aberration in the sixth embodiment can be maintained within a range of ±2.5%. In view of the above, the sixth embodiment is easier to be manufactured and has higher yield rate as compared to the first embodiment.

Based on the above, it can be derived that the half field of view of the sixth embodiment is larger than the half field of view of the first embodiment, and the longitudinal spherical aberration of theسادس embodiment is smaller than the longitudinal spherical aberration of the first embodiment.

Figure 30:
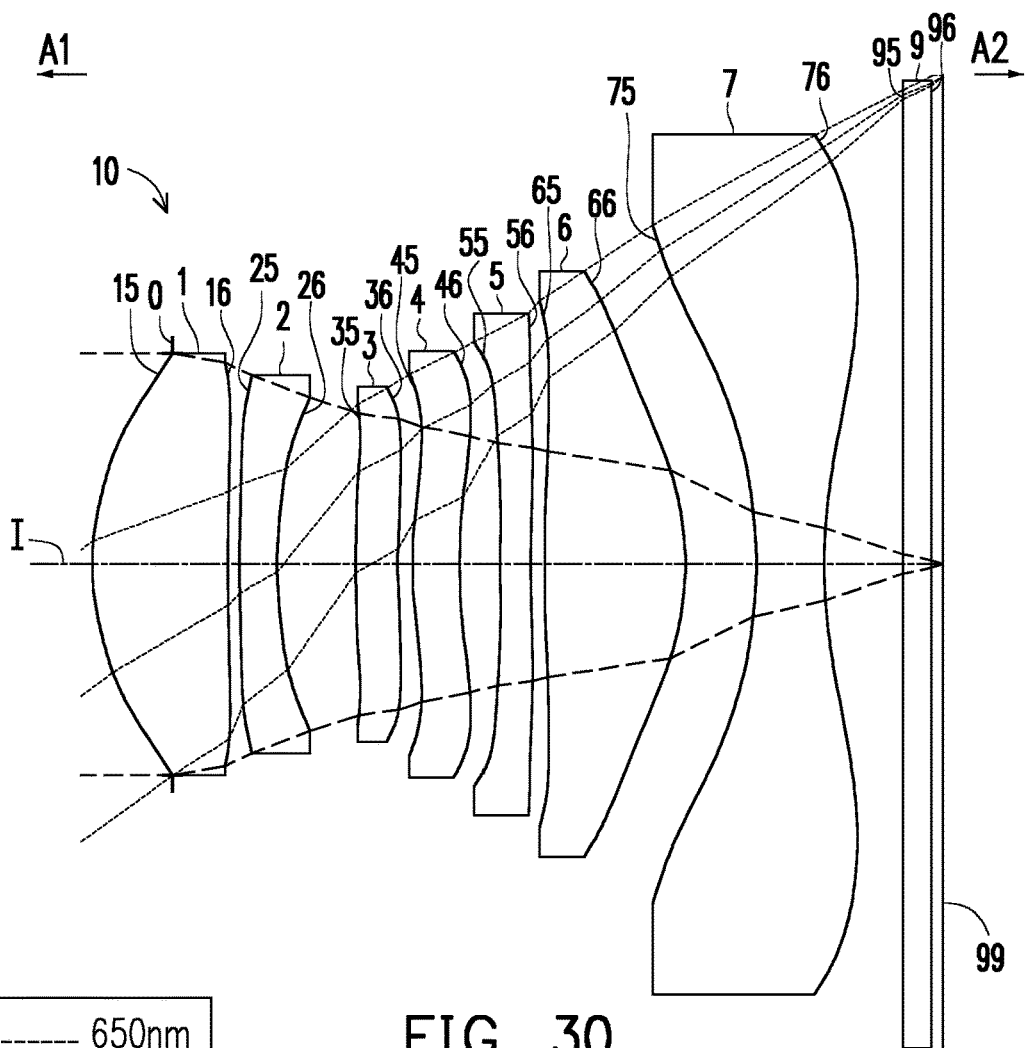
FIG. 30 is a schematic view illustrating an optical imaging lens according to a seventh embodiment of the invention.

FIG. 30 is a schematic view illustrating an optical imaging lens according to a seventh embodiment of the invention, FIGS. 31A to 31D are diagrams illustrating longitudinal spherical aberration and other aberrations of the optical imaging lens according to the seventh embodiment of the invention. Referring to FIG. 30, the seventh embodiment of the optical imaging lens 10 of the invention is similar to the first embodiment, and the difference lies in optical data, aspheric coefficients and the parameters of the lens elements 1, 2, 3, 4, 5, 6 and 7. It should be noted that, in order to show the view clearly, some numerals which are the same as those used for the optical axis region and the periphery region in the first embodiment are omitted in FIG. 30.

Detailed optical data pertaining to the optical imaging lens 10 is as shown in FIG. 32. In the seventh embodiment, the system length of the optical imaging lens 10 is 6.303 mm, the total effective focal length is 4.951 mm, the half field of view (HFOV) is 34.675°, the image height is 3.500 and the f-number (Fno) is 1.587.

FIG. 33 shows each aspheric coefficient pertaining to the object-side surface 15 of the first lens element 1 through the image-side surface 76 of the seventh lens element 7 in the equation (1) in the seventh embodiment.

Additionally, the relationship among the important parameters pertaining to the optical imaging lens 10 of the seventh embodiment is indicated in FIG. 40 and FIG. 41.

Figures 31A, 31B, 31C, 31D:
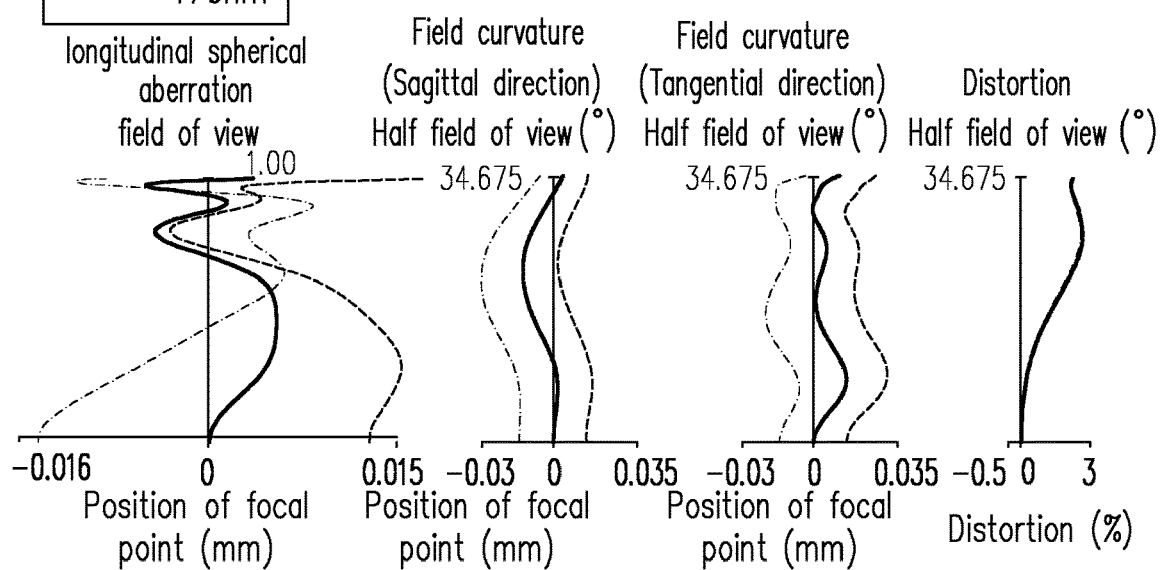
FIG. 31A to FIG. 31D are diagrams illustrating longitudinal spherical aberration and other aberrations of the optical imaging lens according to the seventh embodiment of the invention.

In FIG. 31A which illustrates longitudinal spherical aberration of the seventh embodiment in the condition that the pupil radius is 1.5667 mm, the imaging point deviation of the off-axis ray at different heights is controlled within a range of ±0.018 mm. In FIGS. 31B and 31C which illustrate two diagrams of field curvature aberration, the focal length variation of the three representative wavelengths in the entire field of view falls within a range of ±0.035 mm. In FIG. 31D, the diagram of distortion aberration shows that the distortion aberration in the seventh embodiment can be maintained within a range of ±3.0%. In view of the above, the seventh embodiment provides a good imaging quality as compared to the first embodiment in the condition that the system length is reduced to about 6.303 mm.

Based on the above, it can be derived that the half field of view of the seventh embodiment is larger than the half field of view of the first embodiment, and the longitudinal spherical aberration of the seventh embodiment is smaller than the longitudinal spherical aberration of the first embodiment.

Figure 34:
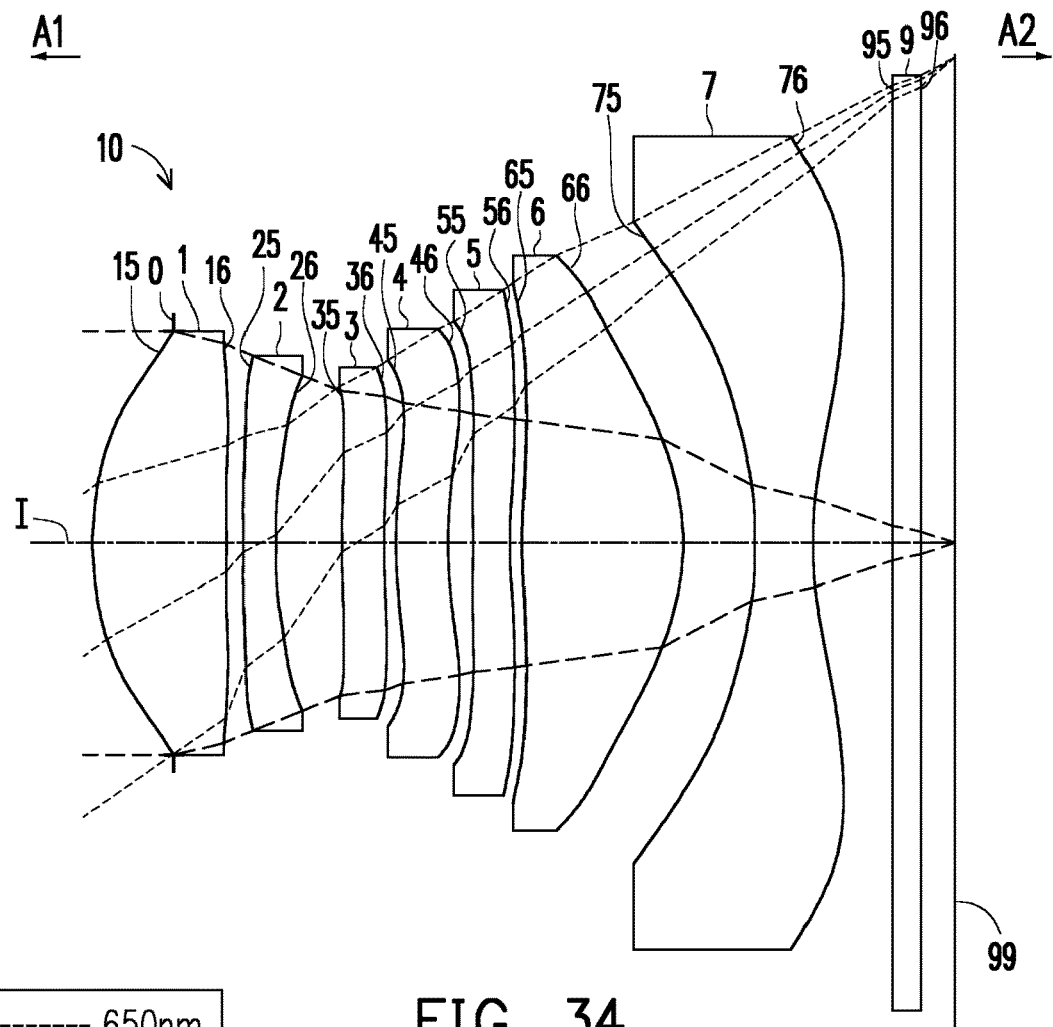
FIG. 34 is a schematic view illustrating an optical imaging lens according to an eighth embodiment of the invention.

FIG. 34 is a schematic view illustrating an optical imaging lens according to an eighth embodiment of the invention, FIGS. 35A to 35D are diagrams illustrating longitudinal spherical aberration and other aberrations of the optical imaging lens according to the eighth embodiment of the invention. Referring to FIG. 34, the eighth embodiment of the optical imaging lens 10 of the invention is similar to the first embodiment, and the difference lies in optical data, aspheric coefficients and the parameters of the lens elements 1, 2, 3, 4, 5, 6 and 7. It should be noted that, in order to show the view clearly, some numerals which are the same as those used for the optical axis region and the periphery region in the first embodiment are omitted in FIG. 34.

Detailed optical data pertaining to the optical imaging lens 10 is as shown in FIG. 36. In the eighth embodiment, the system length of the optical imaging lens 10 is 6.458 mm, the total effective focal length is 5.002 mm, the half field of view (HFOV) is 34.558°, the image height is 3.500 mm and the f-number (Fno) is 1.581.

FIG. 37 shows each aspheric coefficient pertaining to the object-side surface 15 of the first lens element 1 through the image-side surface 76 of the seventh lens element 7 in the equation (1) in the eighth embodiment.

Additionally, the relationship among the important parameters pertaining to the optical imaging lens 10 of the eighth embodiment is indicated in FIG. 40 and FIG. 41.

Figure 35A:
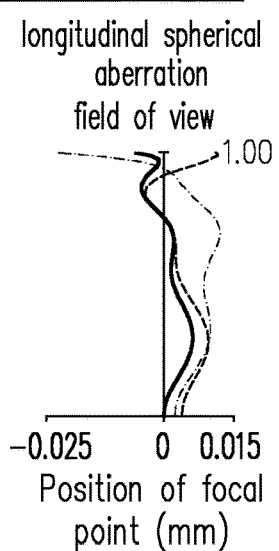
FIG. 35A to FIG. 35D are diagrams illustrating longitudinal spherical aberration and other aberrations of the optical imaging lens according to the eighth embodiment of the invention.
Figure 35B:
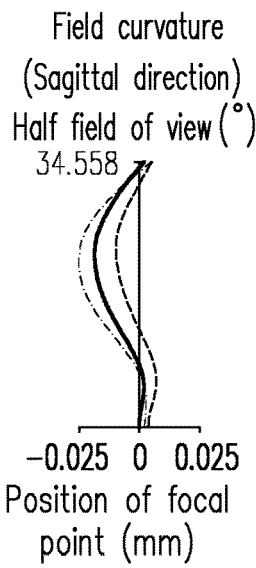
Figure 35C:
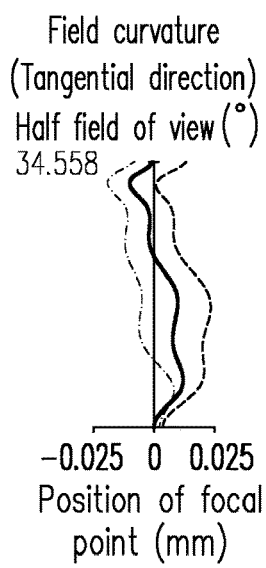
Figure 35D:
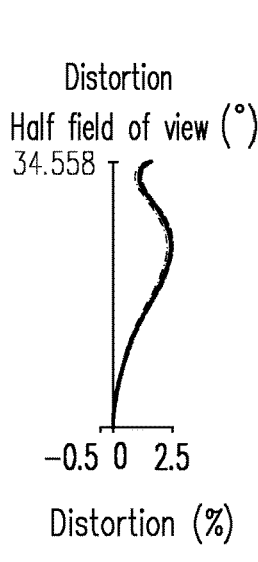

In FIG. 35A which illustrates longitudinal spherical aberration of the eighth embodiment in the condition that the pupil radius is 1.5830 mm, the imaging point deviation of the off-axis ray at different heights is controlled within a range of ±0.025 mm. In FIGS. 35B and 35C which illustrate two diagrams of field curvature aberration, the focal length variation of the three representative wavelengths in the entire field of view falls within a range of ±0.025 mm. In FIG. 35D, the diagram of distortion aberration shows that the distortion aberration in the eighth embodiment can be maintained within a range of ±2.5%. In view of the above, the eighth embodiment provides a good imaging quality as compared to the first embodiment in the condition that the system length is reduced to 6.458 mm.

Based on the above, it can be derived that the system length of the eighth embodiment is smaller than the system length of the first embodiment, and the half field of view of the eighth embodiment is larger than the half field of view of the first embodiment.

In order to shorten the system length of the optical imaging lens and ensure optical quality, it is one of the means of the invention to shorten the air gap between lenses or properly shorten the thickness of the lenses. In the meantime, in consideration of manufacturing difficulty, if the limitation of numerals as set forth in the conditions below is satisfied, a better configuration may be attained.

The optical imaging lens 10 may satisfy the conditional expression: $(T2+T3+T4+T5+T7)/T2 \leq 6.800$, and a preferable range is $5.000 \leq (T2+T3+T4+T5+T7)/T2 \leq 6.800$;

the optical imaging lens 10 may satisfy the conditional expression: $(T1+T4+T5)/G23 \leq 4.000$, and a preferable range is $2.500 \leq (T1+T4+T5)/G23 \leq 4.000$;

the optical imaging lens 10 may satisfy the conditional expression: $ALT/T1 \leq 4.500$, and a preferable range is $3.400 \leq ALT/T1 \leq 4.500$;

the optical imaging lens 10 may satisfy the conditional expression: $AAG/T7 \leq 3.700$, and a preferable range is $2.400 \leq AAG/T7 \leq 3.700$;

the optical imaging lens 10 may satisfy the conditional expression: $AAG/(G23+T2) \leq 2.500$; and a preferable range is $1.700 \leq AAG/(G23+T2) \leq 2.500$;

the optical imaging lens 10 may satisfy the conditional expression: $ALT/(G12+G34+G45+G56) \leq 9.500$, and a preferable range is $5.300 \leq ALT/(G12+G34+G45+G56) \leq 9.500$;

the optical imaging lens 10 may satisfy the conditional expression: $(G23+G67)/T3 \leq 3.500$, and a preferable range is $2.100 \leq (G23+G67)/T3 \leq 3.500$;

the optical imaging lens 10 may satisfy the conditional expression: $(T2+T4+T6)/G67 \leq 3.600$, and a preferable range is $3.000 \leq (T2+T4+T6)/G67 \leq 3.600$;

the optical imaging lens 10 may satisfy the conditional expression: $ALT/G67 \leq 7.200$, and a preferable range is $6.000 \leq ALT/G67 \leq 7.200$;

the optical imaging lens 10 may satisfy the conditional expression: $ALT/(T1+T3+T5) \leq 2.600$, and a preferable range is $2.000 \leq ALT/(T1+T3+T5) \leq 2.600$;

the optical imaging lens 10 may satisfy the conditional expression: $AAG/G67 \leq 3.200$, and a preferable range is $2.200 \leq AAG/G67 \leq 3.200$;

the optical imaging lens 10 may satisfy the conditional expression: $AAG/(T2+T3) \leq 2.800$, and a preferable range is $1.700 \leq AAG/(T2+T3) \leq 2.800$;

the optical imaging lens 10 may satisfy the conditional expression: $BFL/G67 \leq 2.800$, and a preferable range is $1.000 \leq BFL/G67 \leq 2.800$;

the optical imaging lens 10 may satisfy the conditional expression: $EFL/T6 \leq 4.700$, and a preferable range is $3.000 \leq EFL/T6 \leq 4.700$.

The ratio of the parameter of the optical element to the length of the optical imaging lens 10 is maintained to be within an appropriate range to avoid that the parameter of the optical element is too small for the optical element to be produced, or avoid that the parameter of the optical element is too large and consequently the length of the optical imaging lens is too long. If the limitation of numerals as set forth in the conditions below is satisfied, a better configuration may be attained.

The optical imaging lens 10 may satisfy the conditional expression: $TTL/(T1+T6) \leq 3.500$, and a preferable range is $2.400 \leq TTL/(T1+T6) \leq 3.500$;

the optical imaging lens 10 may satisfy the conditional expression: $TTL/(G23+G67) \leq 7.200$, and a preferable range is $5.200 \leq TTL/(G23+G67) \leq 7.200$;

the optical imaging lens 10 may satisfy the conditional expression: $TTL/(T3+T5+T6) \leq 4.000$, and a preferable range is $2.800 \leq TTL/(T3+T5+T6) \leq 4.000$;

the optical imaging lens 10 may satisfy the conditional expression: $TL/G67 \leq 10.200$, and a preferable range is $8.400 \leq TL/G67 \leq 10.200$;

the optical imaging lens 10 may satisfy the conditional expression: TL/(T1+T7)≤4.200, and a preferable range is 3.300≤TL/(T1+T7)≤4.200.

In addition, it is optional to select a random combination relationship of the parameter in the embodiment to increase limitation of the optical imaging lens for the ease of designing the optical imaging lens having the same structure in the invention. Due to the unpredictability in the design of an optical system, with the framework of the embodiments of the invention, under the circumstances where the above-described conditions are satisfied, the optical imaging lens according to the embodiments of the invention with shorter length, increased aperture, improved imaging quality, or better yield rate can be preferably achieved so as to improve the shortcoming of prior art.

The above-limited relation is provided in an exemplary sense and can be randomly and selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. For example, the optical axis region of the object-side surface of the first lens element is concave optionally. It should be noted that the above-described details can be optionally combined and applied to the other embodiments of the invention under the condition where they are not in conflict with one another.

Based on the above, the optical imaging lens 10 in the embodiment of the invention can achieve the following effects and advantages:

1. The longitudinal spherical aberrations, astigmatism aberrations and distortion aberrations of each of the embodiments of the invention are all complied with usage specifications. Moreover, the off-axis rays of different heights of the three representative wavelengths red, green and blue are all gathered around imaging points, and according to a deviation range of each curve, it can be seen that deviations of the imaging points of the off-axis rays of different heights are all controlled to achieve a good capability to suppress spherical aberration, astigmatism aberration and distortion aberration. Further referring to the imaging quality data, distances among the three representative wavelengths red, green and blue are fairly close, which represents that the optical imaging lens of the embodiments of the invention has a good concentration of rays with different wavelengths and under different states, and have an excellent capability to suppress dispersion, so it is learned that the optical imaging lens of the embodiments of the invention has good imaging quality.

2. A periphery region 264 of the image-side surface 26 of the second lens element 2 is designed to be concave to operate together with a periphery region 354 of the object-side surface 35 of the third lens element 3 designed to be concave, which can facilitate ray convergence. Also, the optical imaging lens 10 may collaborate with the design that a periphery region 654 of the object-side surface 65 of the sixth lens element 6 is concave and an optical axis region 661 of the image-side surface 66 of the sixth lens element 6 is convex, which facilitates correction of aberrations generated.

3. Also, the first lens element 1, the third lens element 3 and the fourth lens element 4 are incorporated so that the materials of these lens elements satisfy the condition expression: −10.000≤V1−(V3+V4); in this manner, the length of lens system is shortened while the imaging quality can be ensured. Specifically, a preferable range is −10.000≤V1−(V3+V4)≤20.00.

The numeral range containing the maximum and minimum values obtained through the combination of proportional relationship of the optical parameter disclosed in each embodiment of the invention may be used for implementation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical imaging lens, comprising a first lens element, a second lens element, a third lens element, a fourth lens element, a fifth lens element, a sixth lens element and a seventh lens element arranged in sequence from an object side to an image side along an optical axis, each of the lens elements having an object-side surface facing the object side and allowing an imaging ray to pass through and an image-side surface facing the image side and allowing the imaging ray to pass through, lens elements of the optical imaging lens are only the first lens element, the second lens element, the third lens element, the fourth lens element, the fifth lens element, the sixth lens element and the seventh lens element, wherein, a periphery region of the object-side surface of the second lens element is convex;

an optical axis region of the object-side surface of the third lens element is convex, and an optical axis region of the image-side surface of the third lens element is concave; and the fifth lens element has negative refracting power, a periphery region of the object-side surface of the fifth lens element is concave, and an optical axis region of the image-side surface of the fifth lens element is concave, wherein the optical imaging lens satisfies the following condition expression:

$ALT/T1 \leq 4.500$ and $TTL/(G23+G67) \leq 7.200$, wherein ALT is a sum of center thicknesses of the seven lens elements including the first lens element through the seventh lens element along the optical axis, and T1 is a center thickness of the first lens element along the optical axis, TTL is a distance from the object-side surface of the first lens element to an image plane of the optical imaging lens along the optical axis, G23 is an air gap between the second lens element and the third lens element along the optical axis, and G67 is an air gap between the sixth lens element and the seventh lens element along the optical axis.

2. The optical imaging lens according to claim 1, wherein a periphery region of the image-side surface of the sixth lens element is convex.

3. The optical imaging lens according to claim 1, wherein the optical imaging lens further satisfies the following condition expression: TL/(T1+T7)≤4.200, wherein TL is a distance from of the object-side surface of the first lens element to the image-side surface of the seventh lens element along the optical axis, and T7 is a center thickness of the seventh lens element along the optical axis.

4. The optical imaging lens according to claim 1, wherein the fourth lens element has positive refracting power.

5. The optical imaging lens according to claim 1, wherein the optical imaging lens satisfies the following condition expression: (T2+T4+T6)/G67≤3.600, wherein T2 is a center thickness of the second lens element along the optical axis, T4 is a center thickness of the fourth lens element along the optical axis, and T6 is a center thickness of the sixth lens element along the optical axis.

6. The optical imaging lens according to claim 1, wherein the optical imaging lens satisfies the following condition expression: 2.422≤(T2+T3+G56)/G45≤4.054, wherein T2 is a center thickness of the second lens element along the optical axis, T3 is a center thickness of the third lens element along the optical axis, G45 is an air gap between the fourth lens element and the fifth lens element along the optical axis, and G56 is an air gap between the fifth lens element and the sixth lens element along the optical axis.

7. An optical imaging lens, comprising a first lens element, a second lens element, a third lens element, a fourth lens element, a fifth lens element, a sixth lens element and a seventh lens element arranged in sequence from an object side to an image side along an optical axis, each of the lens elements having an object-side surface facing the object side and allowing an imaging ray to pass through and an image-side surface facing the image side and allowing the imaging ray to pass through, lens elements of the optical imaging lens are only the first lens element, the second lens element, the third lens element, the fourth lens element, the fifth lens element, the sixth lens element and the seventh lens element, wherein, a periphery region of the object-side surface of the second lens element is convex;

the third lens element has negative refracting power, and an optical axis region of the object-side surface of the third lens element is convex; and the seventh lens element has negative refracting power, and an optical axis region of the object-side surface of the seventh lens element is concave, wherein the optical imaging lens satisfies the following condition expression:

$ALT/T1 \leq 4.500$ and $(T2+T4+T6)/G67 \leq 3.600$, wherein ALT is a sum of center thicknesses of the seven lens elements including the first lens element through the seventh lens element along the optical axis, and T1 is a center thickness of the first lens element along the optical axis, T2 is a center thickness of the second lens element along the optical axis, T4 is a center thickness of the fourth lens element along the optical axis, T6 is a center thickness of the sixth lens element along the optical axis, and G67 is an air gap between the sixth lens element and the seventh lens element along the optical axis.

8. The optical imaging lens according to claim 7, wherein an optical axis region of the object-side surface of the sixth lens element is convex.

9. The optical imaging lens according to claim 7, wherein the optical imaging lens satisfies the following condition expression: AAG/G67≤3.200, wherein AAG is a sum of six air gaps including the first lens element through the seventh lens element along the optical axis.

10. The optical imaging lens according to claim 7, wherein the optical imaging lens satisfies the following condition expression: BFL/G67≤2.800, wherein BFL is a distance from the image-side surface of the seventh lens element to an image plane of the optical imaging lens along the optical axis.

11. The optical imaging lens according to claim 7, wherein the optical imaging lens satisfies the following condition expression: 2.579≤(T1+T2+G34)/T7≤3.155, wherein T7 is a center thickness of the seventh lens element along the optical axis, and G34 is an air gap between the third lens element and the fourth lens element along the optical axis.

12. The optical imaging lens according to claim 7 wherein the optical imaging lens satisfies the following condition expression: ALT/(G12+G34+G45+G56)≤9.500, wherein G12 is an air gap between the first lens element and the second lens element along the optical axis, G34 is an air gap between the third lens element and the fourth lens element along the optical axis, G45 is an air gap between the fourth lens element and the fifth lens element along the optical axis, and G56 is an air gap between the fifth lens element and the sixth lens element along the optical axis.

13. The optical imaging lens according to claim 7, wherein the first lens element has positive refracting power.

14. An optical imaging lens, comprising a first lens element, a second lens element, a third lens element, a fourth lens element, a fifth lens element, a sixth lens element and a seventh lens element arranged in sequence from an object side to an image side along an optical axis, each of the lens elements having an object-side surface facing the object side and allowing an imaging ray to pass through and an image-side surface facing the image side and allowing the imaging ray to pass through, lens elements of the optical imaging lens are only the first lens element, the second lens element, the third lens element, the fourth lens element, the fifth lens element, the sixth lens element and the seventh lens element, wherein, an optical axis region of the image-side surface of the first lens element is concave;

a periphery region of the object-side surface of the second lens element is convex;

the third lens element has negative refracting power;

an optical axis region of the object-side surface of the fifth lens element is convex;

an optical axis region of the object-side surface of the seventh lens element is concave; and a center thickness of the fourth lens element along the optical axis is less than an air gap between the sixth lens element and the seventh lens element along the optical axis, wherein the optical imaging lens satisfies the following condition expression:

$ALT/T1 \leq 4.500$, wherein ALT is a sum of center thicknesses of the seven lens elements including the first lens element through the seventh lens element along the optical axis, and T1 is a center thickness of the first lens element along the optical axis.

15. The optical imaging lens according to claim 4, wherein the optical imaging lens satisfies the following condition expression: TL/G67≤10.200, wherein TL is a distance from of the object-side surface of the first lens element to the image-side surface of the seventh lens element along the optical axis, and G67 is the air gap between the sixth lens element and the seventh lens element along the optical axis.

16. The optical imaging lens according to claim 14, wherein the optical imaging lens satisfies the following condition expression: 2.709≤EFL/(T1+G45+T7)≤3.209, wherein EFL is an effective focal length of the optical imaging lens, G45 is an air gap between the fourth lens element and the fifth lens element along the optical axis, and T7 is a center thickness of the seventh lens element along the optical axis.

17. The optical imaging lens according to claim 14, wherein the optical imaging lens satisfies the following condition expression: $ALT/(T1+T3+T5) \leq 2.600$, wherein T3 is a center thickness of the third lens element along the optical axis, and T5 is a center thickness of the fifth lens element along the optical axis.

18. The optical imaging lens according to claim 14, wherein a periphery region of the object-side surface of the sixth lens element is concave.

19. The optical imaging lens according to claim 14, wherein the optical imaging lens further satisfies the following condition expression: $ALT/G67 \leq 7.200$, wherein G67 is the air gap between the sixth lens element and the seventh lens element along the optical axis.

* * * * *